United States Patent
Yonekubo

(12) 
(10) Patent No.: US 10,282,906 B2
(45) Date of Patent: May 7, 2019

(54) VIRTUAL IMAGE DISPLAY DEVICE AND HEAD-MOUNTED DISPLAY

(71) Applicant: Seiko Epson Corporation, Tokyo (JP)

(72) Inventor: Masatoshi Yonekubo, Hara (JP)

(73) Assignee: Seiko Epson Corporation (JP)

( * ) Notice: Subject to any disclaimer, the term of this patent is extended or adjusted under 35 U.S.C. 154(b) by 173 days.

(21) Appl. No.: 14/669,314

(22) Filed: Mar. 26, 2015

(65) Prior Publication Data
US 2015/0279114 A1 Oct. 1, 2015

(30) Foreign Application Priority Data
Mar. 27, 2014 (JP) ................................. 2014-066358

(51) Int. Cl.
*G06T 19/00* (2011.01)
*G02B 27/01* (2006.01)
*F21V 8/00* (2006.01)

(52) U.S. Cl.
CPC .......... *G06T 19/006* (2013.01); *G02B 6/0031* (2013.01); *G02B 6/0076* (2013.01); *G02B 27/0172* (2013.01); *G02B 27/01* (2013.01); *G02B 2027/0178* (2013.01)

(58) Field of Classification Search
CPC .......... G02B 27/01; G02B 27/0101; G02B 27/0149; G02B 27/017; G02B 27/0176; G02B 27/0179; G06T 19/006; H04N 13/044; H04N 5/7491
USPC ............. 359/13, 618, 629–633; 345/7–8, 345/632–633; 348/113–120
See application file for complete search history.

(56) References Cited

U.S. PATENT DOCUMENTS

| 9,182,597 B2 * | 11/2015 | Dominici ........... G02B 27/0081 |
| 2002/0163734 A1 | 11/2002 | Inoguchi |
| 2006/0228073 A1 | 10/2006 | Mukawa et al. |
| 2008/0239424 A1 | 10/2008 | Mukawa et al. |

(Continued)

FOREIGN PATENT DOCUMENTS

| CN | 101730859 A | 6/2010 |
| EP | 0007432 A1 | 2/1980 |

(Continued)

OTHER PUBLICATIONS

Extended European Search Report for Application No. EP 15 16 0773 dated Oct. 26, 2015 (7 pages).

*Primary Examiner* — Kristina M Deherrera
(74) *Attorney, Agent, or Firm* — Harness, Dickey & Pierce, P.L.C.

(57) ABSTRACT

A virtual image display device including an image generator for generating a picture light beam modulated based on a video signal, and an optical element including a plane of incidence to which the picture light beam emitted from the image generator is input, and an exit surface emitting the picture light beam after a cross-sectional area of the picture light beam input to the plane of incidence has been enlarged. The optical element includes a first light guide and a second light guide connecting the plane of incidence and the exit surface and guiding the picture light beam. A first light branching layer is disposed between the first and second light guides, and partially reflects and partially transmits the picture light beam. The picture light beam emitted from the image generator obliquely enters the first light branching layer.

20 Claims, 21 Drawing Sheets

(56) References Cited

U.S. PATENT DOCUMENTS

| | | |
|---|---|---|
| 2009/0015929 A1 | 1/2009 | DeJong et al. |
| 2009/0251788 A1 | 10/2009 | DeJong et al. |
| 2010/0220295 A1 | 9/2010 | Mukawa et al. |
| 2011/0211239 A1 | 9/2011 | Mukawa et al. |
| 2011/0277361 A1* | 11/2011 | Nichol ................. G02B 6/0018 40/541 |
| 2012/0081789 A1 | 4/2012 | Mukawa et al. |
| 2012/0206811 A1 | 8/2012 | Mukawa et al. |
| 2013/0155513 A1 | 6/2013 | Mukawa et al. |
| 2013/0222896 A1* | 8/2013 | Komatsu ............ G02B 17/0848 359/365 |
| 2014/0043688 A1 | 2/2014 | Schrader |
| 2015/0355467 A1 | 12/2015 | Mukawa et al. |
| 2016/0170215 A1 | 6/2016 | Mukawa et al. |

FOREIGN PATENT DOCUMENTS

| | | |
|---|---|---|
| EP | 2631695 A1 | 8/2013 |
| GB | 1527049 A | 10/1978 |
| JP | 07-325267 A | 12/1995 |
| JP | 2006-138965 A | 6/2006 |
| JP | 2008-041513 A | 2/2008 |
| JP | 2009-258656 A | 11/2009 |
| JP | 2010-533316 A | 10/2010 |
| JP | 2011-075956 A | 4/2011 |
| WO | WO-2005-093493 A1 | 10/2005 |
| WO | WO-2009-009268 A1 | 1/2009 |

* cited by examiner

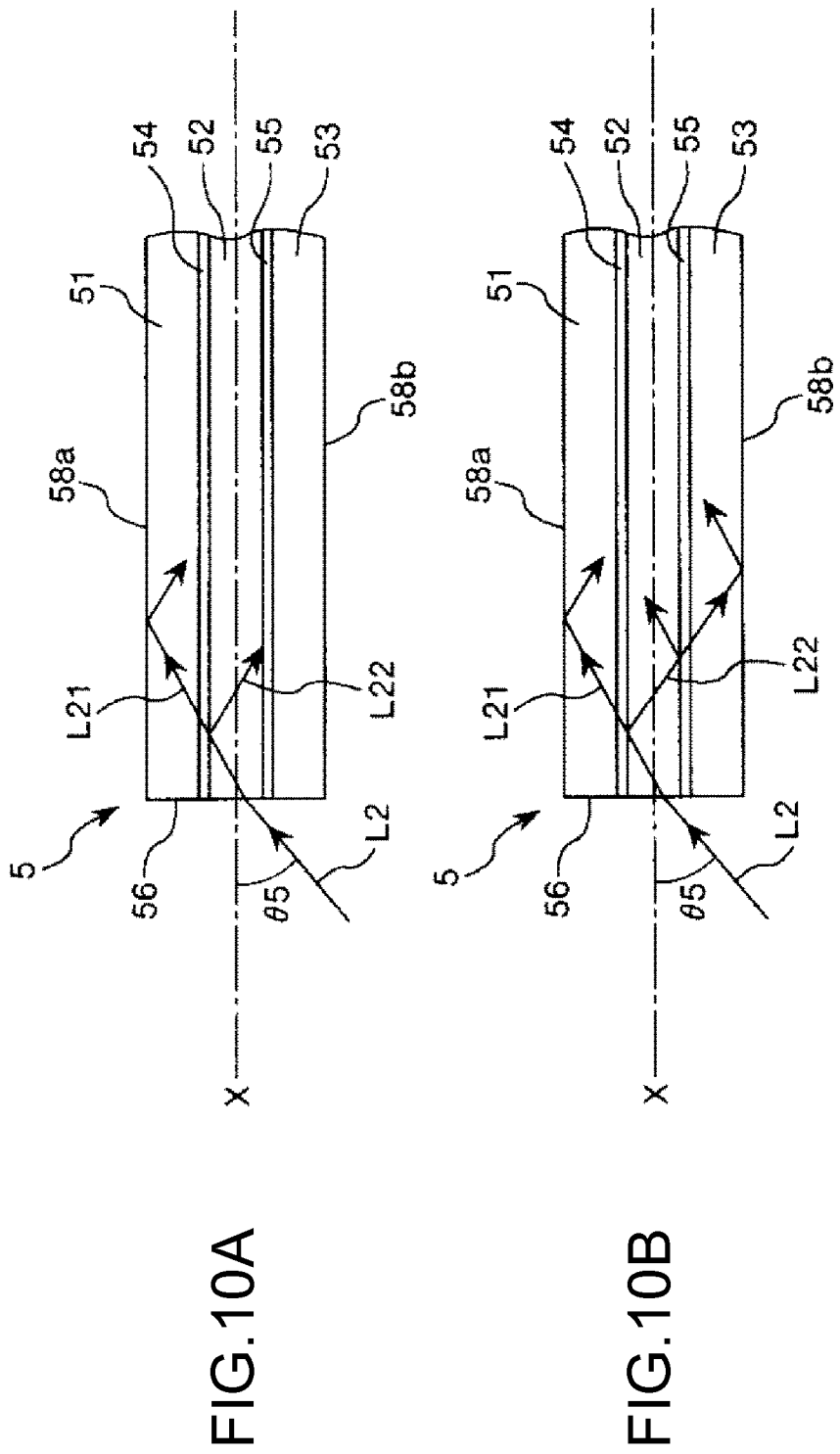

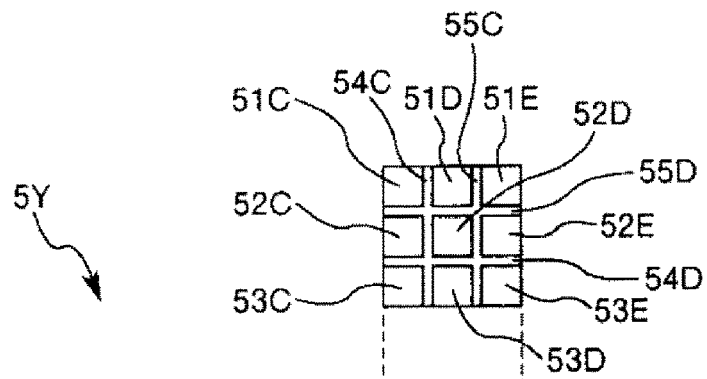
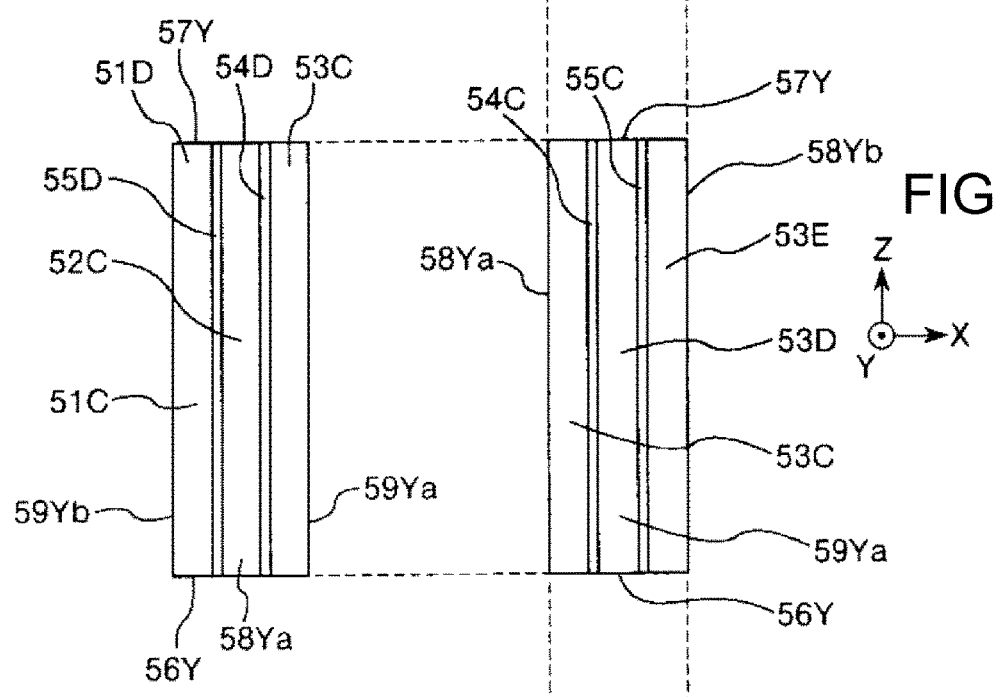
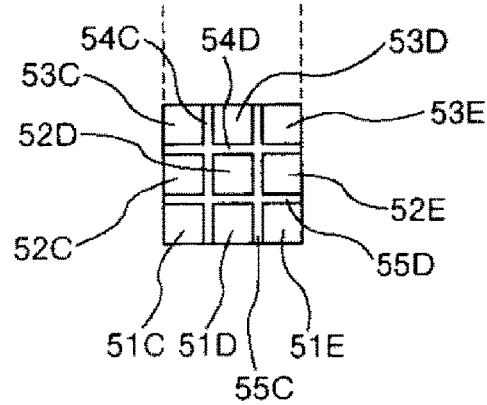
FIG.13D
FIG.13B
FIG.13A
FIG.13C

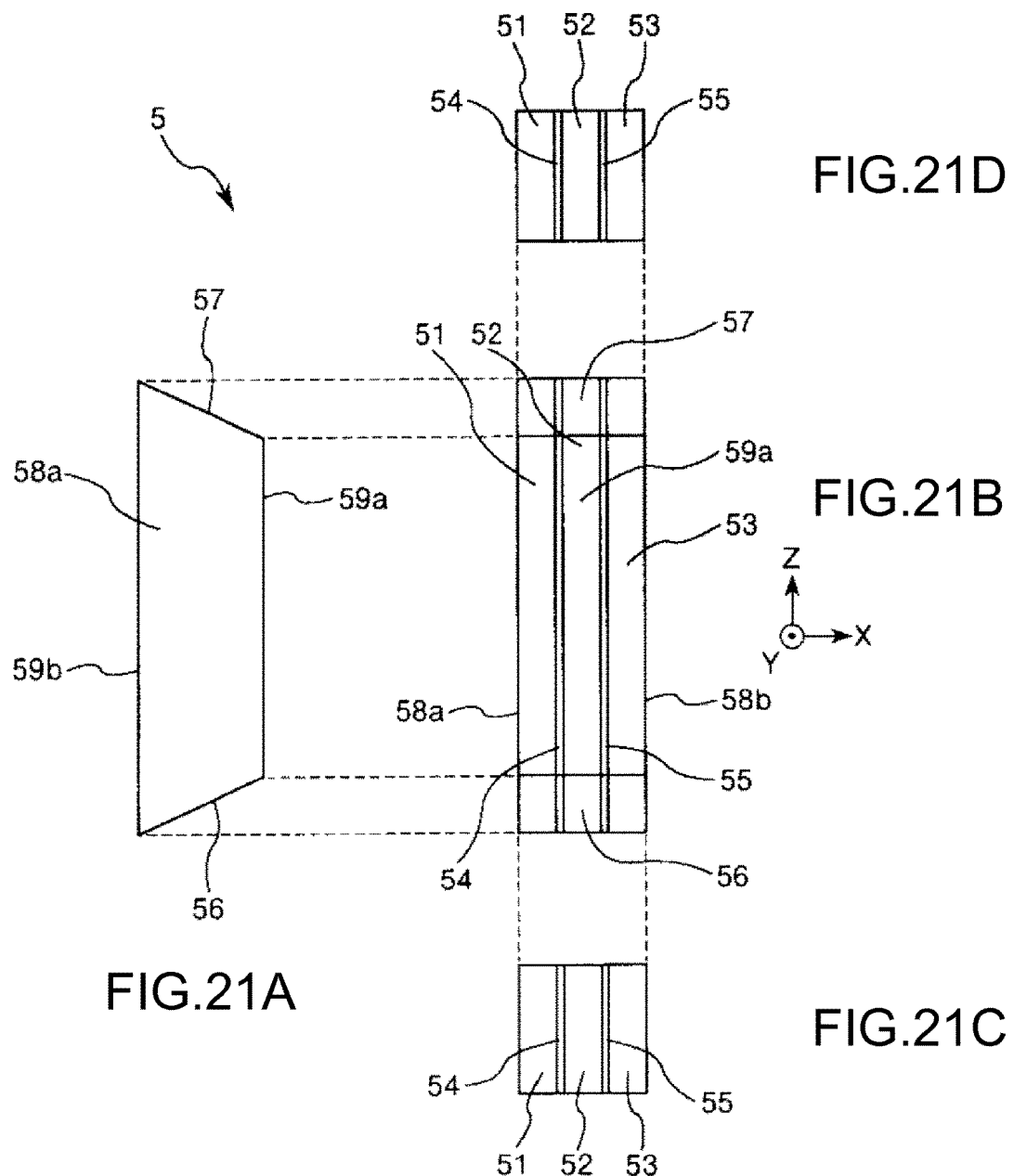

VIRTUAL IMAGE DISPLAY DEVICE AND HEAD-MOUNTED DISPLAY

BACKGROUND

1. Technical Field

The present invention relates to a virtual image display device and a head-mounted display.

2. Related Art

In recent years, as a virtual image display device for making the formation and observation of a virtual image possible such as a head-mounted display (HMD), there have been proposed various devices that guide a picture light beam from a display element to the pupils of the observer using a light guide plate.

As such a virtual display device, there has been known a head-mounted display as described in JP-A-2011-75956.

The head-mounted display described in JP-A-2011-75956 has a configuration of moving the picture light beam entering the pupils in accordance with the movement of the human eyes to thereby realize a head-mounted display that is easy for user to visually recognize. However, such a head-mounted display requires a detection device of the pupil position, constituents (e.g., eyepiece lenses, and a position changing device and a control section of an image light emission unit) for changing the positions of exit pupils, and so on in order to match the picture light beam entering the pupils with the movement of the human eyes, and has a problem that the structure becomes complicated.

SUMMARY

An advantage of the invention is to provide a virtual image display device having a simple structure and capable of magnifying the picture light beam, and a head-mounted display, which is equipped with such a virtual image display device, and is easy for the observer to visually recognize.

Such an advantage can be achieved by the following configurations.

A virtual image display device according to an aspect of the invention includes an image generation section adapted to generate a picture light beam modulated based on a video signal, and an optical element including a plane of incidence to which the picture light beam emitted from the image generation section is input, and an exit surface adapted to emit a picture light beam obtained by enlarging a cross-sectional area of the picture light beam input to the plane of incidence, the optical element includes a first light guide section and a second light guide section adapted to connect the plane of incidence and the exit surface to each other to guide the picture light beam emitted from the image generation section, and a first light branching layer disposed between the first light guide section and the second light guide section, and adapted to partially reflect the picture light beam emitted from the image generation section, and partially transmit the picture light beam, and the picture light beam emitted from the image generation section obliquely enters the first light branching layer.

According to this configuration, it is possible to provide the virtual image display device having a simple structure, and capable of magnifying the picture light beam generated by the image generation section.

In the virtual image display device according to the aspect of the invention, it is preferable that the optical element includes a first one-dimensional array having the first light guide section and the second light guide section one-dimensionally arranged along a first direction.

According to this configuration, it is possible to multiply reflect the picture light beam generated by the image generation section inside the optical element, and thus, the picture light beam can be further magnified.

In the virtual image display device according to the aspect of the invention, it is preferable that the optical element includes a second one-dimensional array having the first light guide section and the second light guide section one-dimensionally arranged along a second direction different from the first direction, and the second one-dimensional array is disposed so that the picture light beam emitted from one exit surface of the first one-dimensional array enters a plane of incidence of the second one-dimensional array.

According to this configuration, the picture light beam generated by the image generation section can be magnified in the first direction and the second direction.

In the virtual image display device according to the aspect of the invention, it is preferable that the exit surface of the first one-dimensional array and the plane of incidence of the second one-dimensional array are connected to each other.

According to this configuration, the light efficiency can be further improved.

In the virtual image display device according to the aspect of the invention, it is preferable that the optical element further includes a third light guide section adapted to connect the plane of incidence and the exit surface to each other to guide the picture light beam, and a second light branching layer disposed between the first light guide section and the third light guide section, and adapted to partially reflect the picture light beam, and partially transmit the picture light beam, the first light guide section and the second light guide section are arranged along a first direction, and the first light guide section and the third light guide section are arranged along a second direction different from the first direction.

According to this configuration, the picture light beam generated by the image generation section can be magnified in the first direction and the second direction.

In the virtual image display device according to the aspect of the invention, it is preferable that a width of each of the first light guide section and the second light guide section along a direction, in which the first light guide section and the second light guide section are arranged, is smaller than a width of the picture light beam along the direction, in which the first light guide section and the second light guide section are arranged, on the plane of incidence.

According to this configuration, it is possible to multiply reflect the picture light beam generated by the image generation section inside the optical element, and thus, the homogeneity of the intensity distribution of the picture light beam emitted from the exit surface can be further improved.

In the virtual image display device according to the aspect of the invention, it is preferable that the plane of incidence and the exit surface are equal to each other in an absolute value of a tilt angle with respect to the first light branching layer.

According to this configuration, the amount of the refraction of the picture light beam entering the plane of incidence and the amount of the refraction of the picture light beam emitted from the exit surface can be made equal to each other, and thus, the color aberration can be prevented from occurring.

In the virtual image display device according to the aspect of the invention, it is preferable that the virtual image display device further includes a light deflection section adapted to deflect the picture light beam emitted from the exit surface of the optical element toward a direction of an eye of an observer, and the light deflection section includes a hologram.

According to this configuration, the angle and the light beam state of the picture light beam to be guided to the eyes of the observer can easily be adjusted.

In the virtual image display device according to the aspect of the invention, it is preferable that the virtual image display device further include a magnifying light guide section adapted to two-dimensionally magnifying the picture light beam emitted from the optical element, the magnifying light guide section includes a light entrance section to which the picture light beam is input, a first magnifying light guide section adapted to include a first reflecting surface disposed obliquely to an incident direction in which the picture light beam enters the light entrance section, and a second reflecting surface disposed in parallel to the first reflecting surface, and adapted to partially reflect the picture light beam, and to partially transmit the picture light beam, and a second magnifying light guide section adapted to guide the picture light beam transmitted through the second reflecting surface.

According to this configuration, it is possible to multiply reflect the picture light beam emitted from the optical element in the first magnifying light guide section and the second magnifying light guide section, and thus, the picture light beam can be further magnified.

In the virtual image display device according to the aspect of the invention, it is preferable that the image generation section includes a light source adapted to emit a light beam, and a light scanner adapted to move the light beam emitted from the light source to perform scanning.

According to this configuration, it is possible to make a clear picture light beam enter the optical element.

In the virtual image display device according to the aspect of the invention, it is preferable that the image generation section includes a light source, and a spatial light modulation device adapted to modulate a light beam emitted from the light source in accordance with the video signal.

According to this configuration, it is possible to make a clear picture light beam enter the optical element.

In the virtual image display device according to the aspect of the invention, it is preferable that the image generation section includes an organic EL panel.

According to this configuration, it is possible to make the clear picture light beam enter the magnifying light guide section, and at the same time achieve miniaturization of the image generation section.

A head-mounted display according to another aspect of the invention includes the virtual image display device according to the aspect of the invention, and the head-mounted display is mounted on a head of an observer.

According to this configuration, the head-mounted display that is easy for the observer to visually recognize can be provided.

In the head-mounted display according to the aspect of the invention, it is preferable that the optical element is disposed so that the cross-sectional area of the picture light beam emitted from the exit surface of the optical element is enlarged in a direction, in which a right eye and a left eye of the observer are arranged, in a state in which the head-mounted display is mounted on the head of the observer.

According to this configuration, the head-mounted display that is even easier for the observer to visually recognize can be provided.

BRIEF DESCRIPTION OF THE DRAWINGS

Embodiments of the invention will be described with reference to the accompanying drawings, wherein like numbers reference like elements.

FIGS. 8A through 8D are diagrams showing a schematic configuration of an optical element shown in FIG. 3, wherein FIG. 8A is a front view, FIG. 8B is a plan view, FIG. 8C is a right side view, and FIG. 8D is a left side view.

FIGS. 10A and 10B are diagrams for explaining paths of the picture light beam having entered the optical element shown in FIGS. 8A through 8D.

FIGS. 11A through 11D are diagrams showing a schematic configuration of an optical element provided to a virtual image display device according to a second embodiment of the invention, wherein FIG. 11A is a front view, FIG. 11B is a plan view, FIG. 11C is a right side view, and FIG. 11D is a left side view.

FIGS. 13A through 13D are diagrams showing a schematic configuration of an optical element provided to a virtual image display device according to a third embodiment of the invention, wherein FIG. 13A is a front view, FIG. 13B is a plan view, FIG. 13C is a right side view, and FIG. 13D is a left side view.

FIGS. 15A and 15B are diagrams showing an optical element provided to a virtual image display device according to a fourth embodiment of the invention, wherein FIG. 15A is a plan view, and FIG. 15B is a side view.

FIGS. 21A through 21D are diagrams showing another example of the optical element shown in FIG. 3, wherein FIG. 21A is a front view, FIG. 21B is a plan view, FIG. 21C is a right side view, and FIG. 21D is a left side view.

DESCRIPTION OF EXEMPLARY EMBODIMENTS

Virtual image display devices and head-mounted displays as some exemplary embodiments of the invention will hereinafter be described with reference to the accompanying drawings.

First Embodiment

Figure 1:
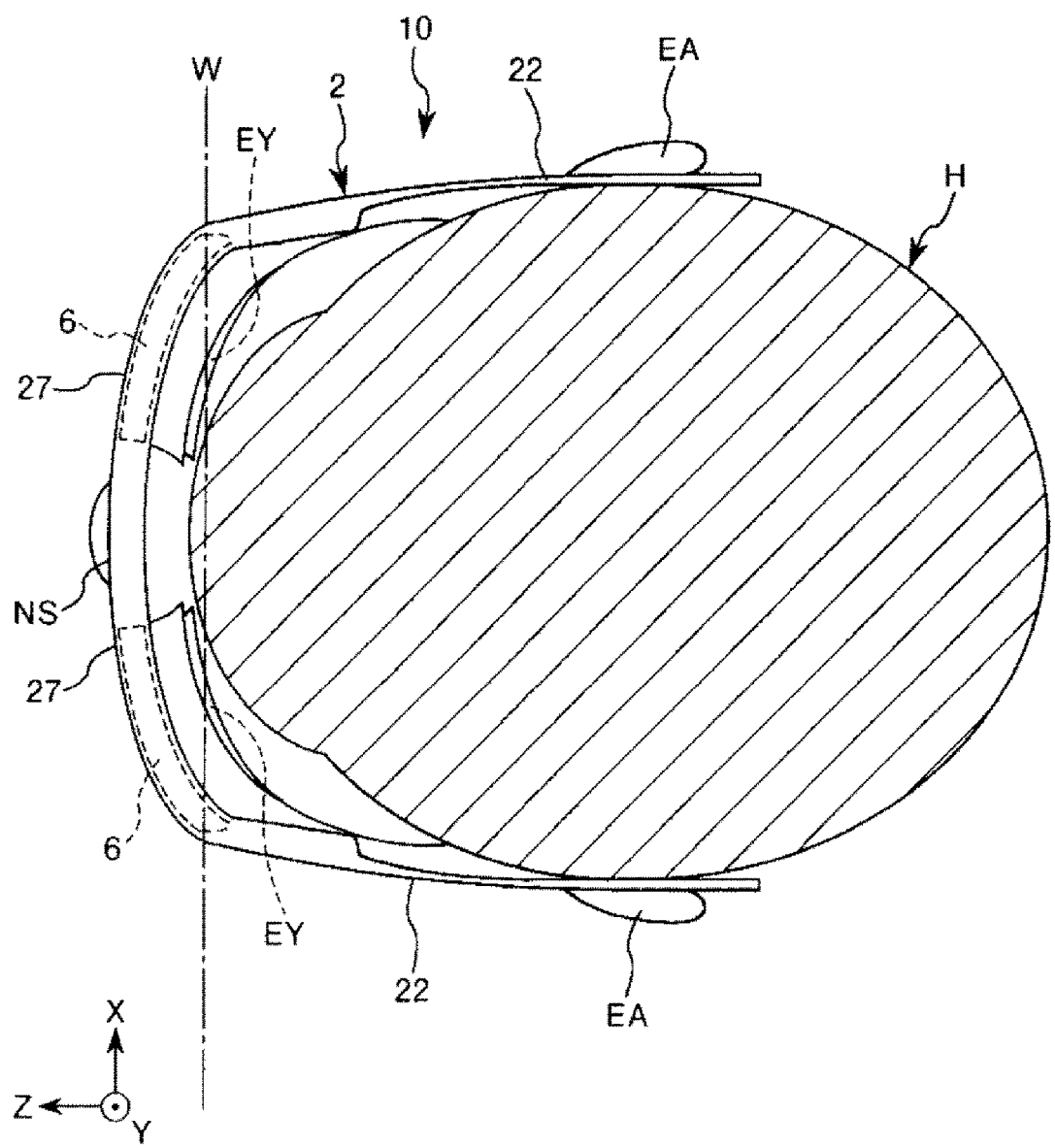
FIG. 1 is a diagram showing a schematic configuration of a head-mounted display equipped with a virtual image display device according to a first embodiment of the invention.
Figure 2:
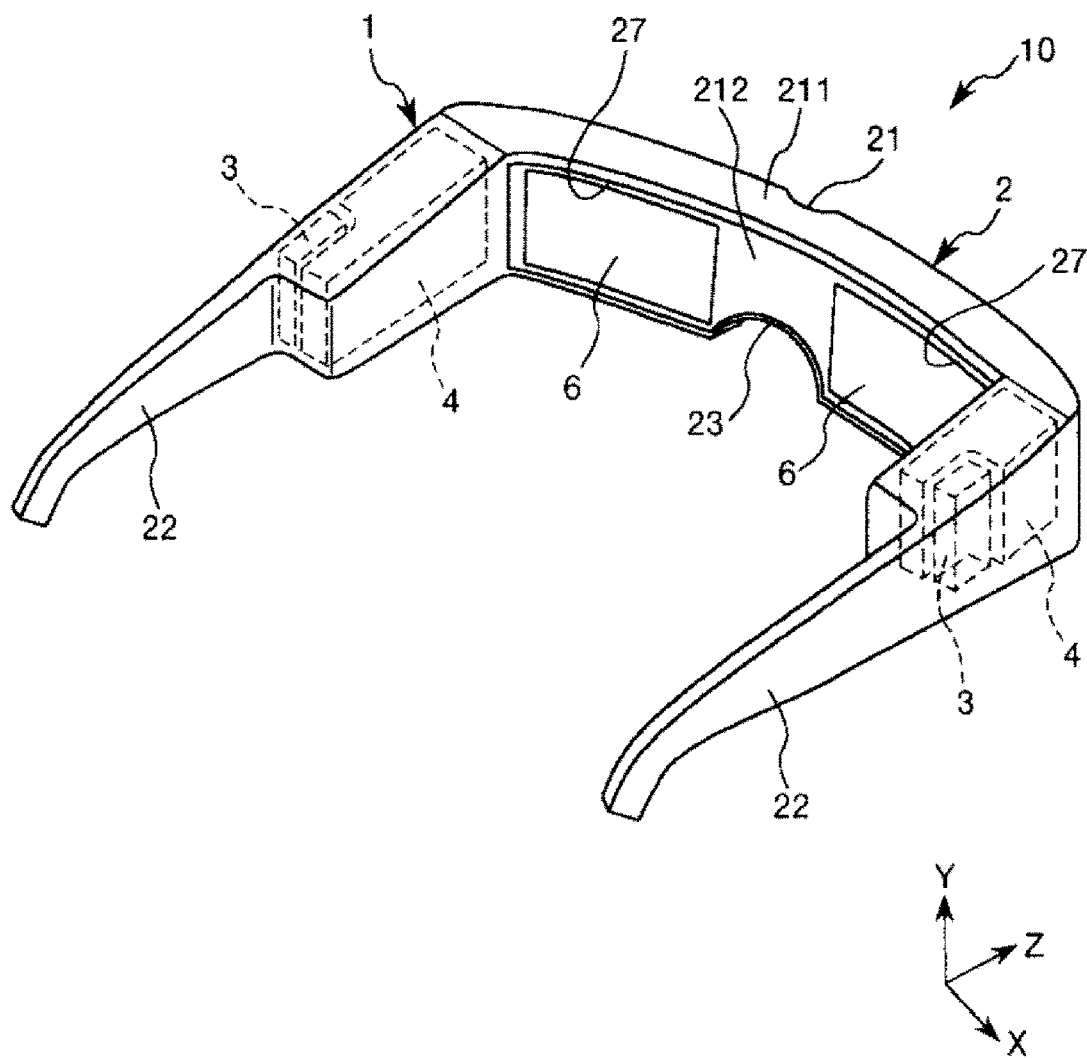
FIG. 2 is a schematic perspective view of the head-mounted display shown in FIG. 1.
Figure 3:
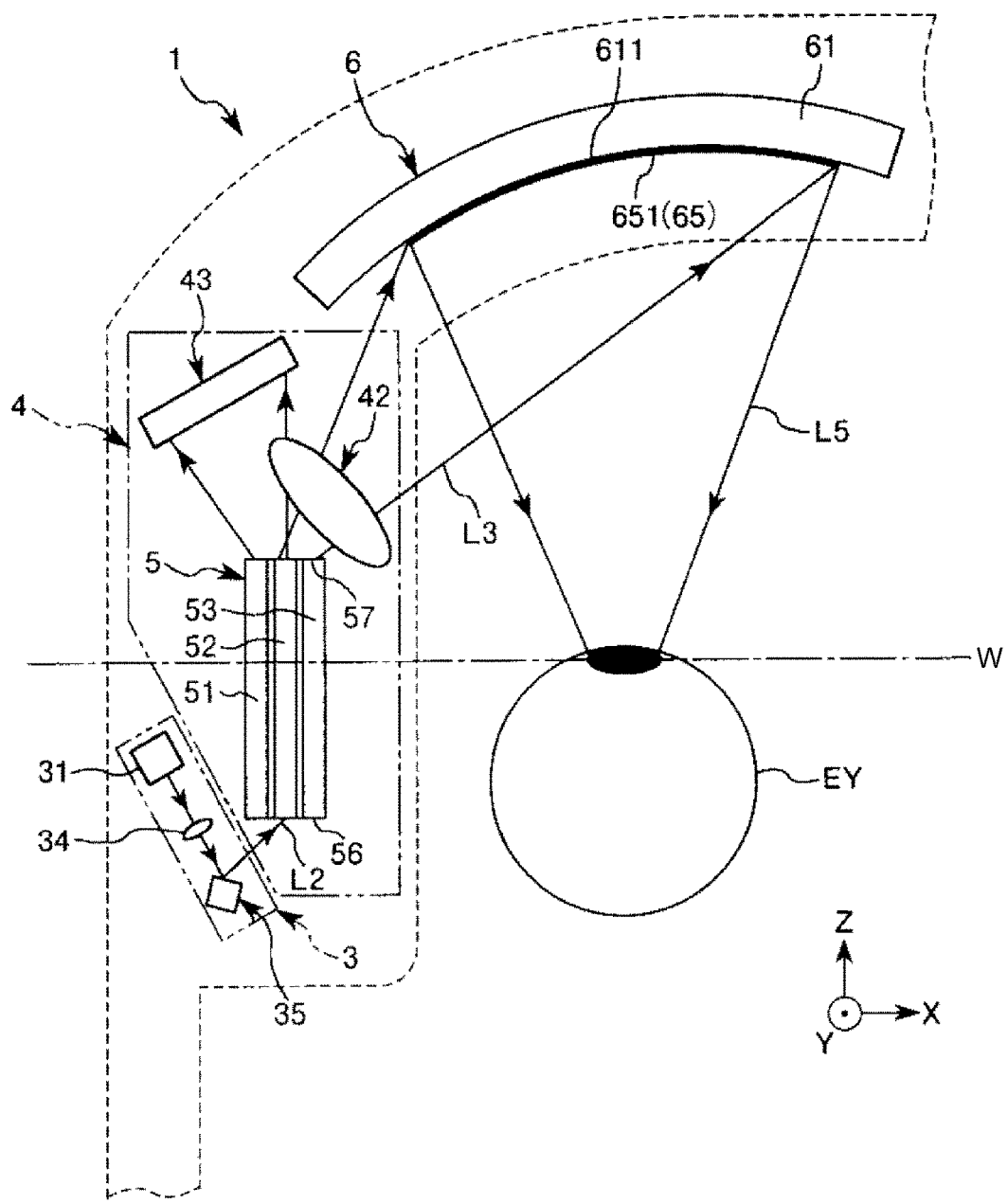
FIG. 3 is a diagram schematically showing a configuration of the virtual image display device shown in FIG. 1.
Figure 4:
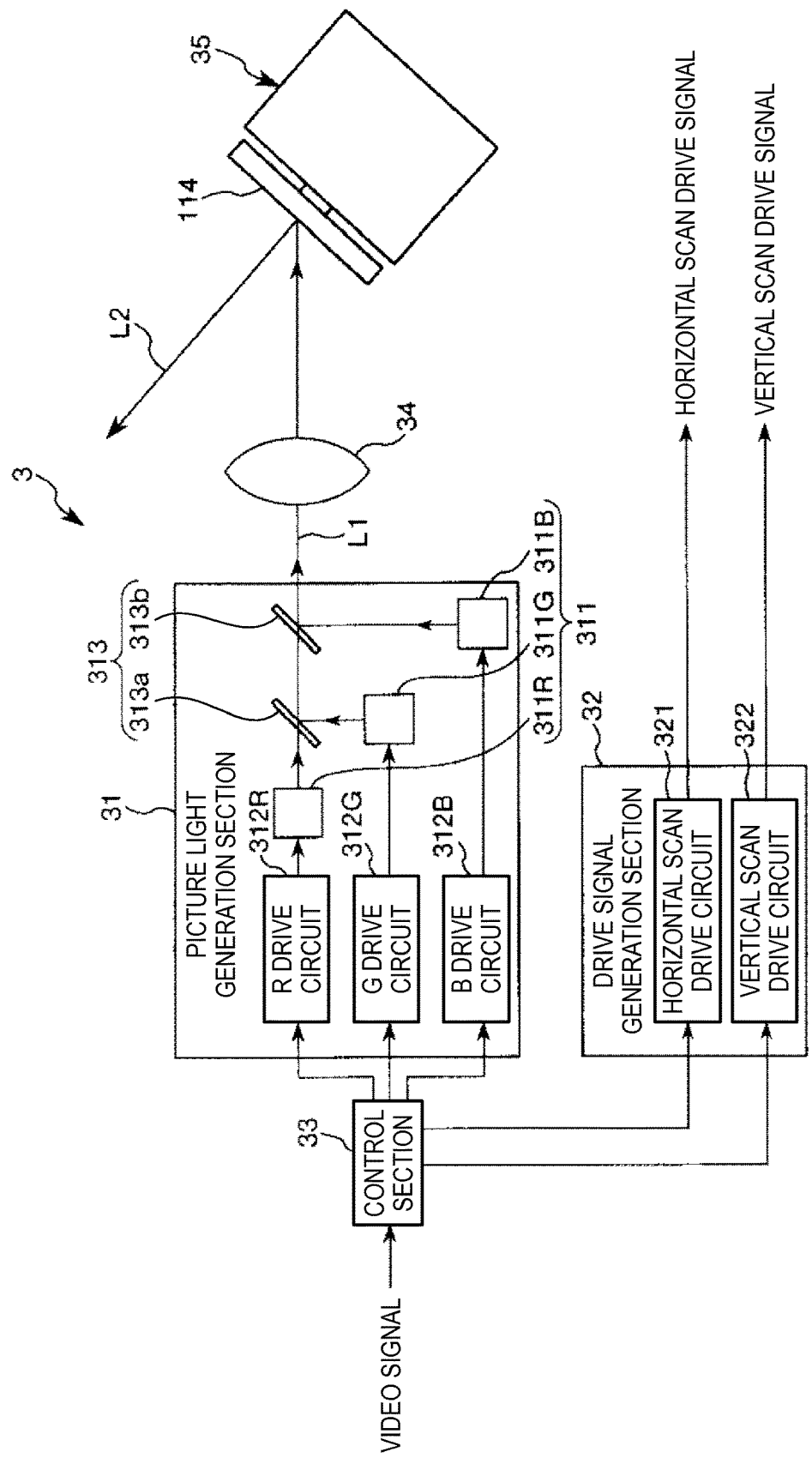
FIG. 4 is a diagram schematically showing a configuration of an image generation section shown in FIG. 2.
Figure 5A:
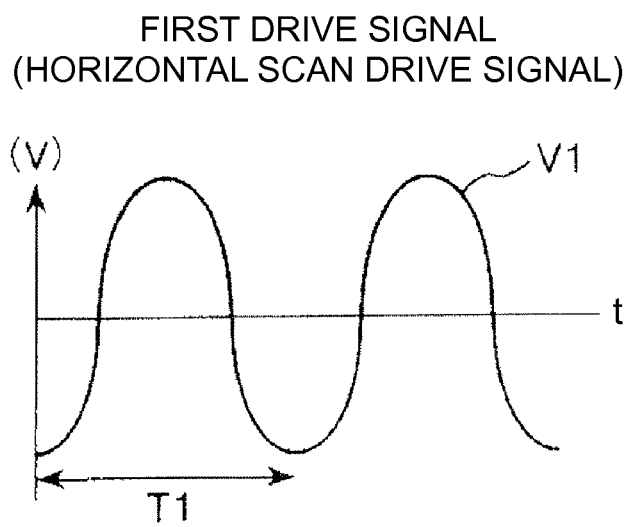
FIGS. 5A and 5B are diagrams each showing an example of a drive signal of a drive signal generation section shown in FIG. 4.
Figure 5B:
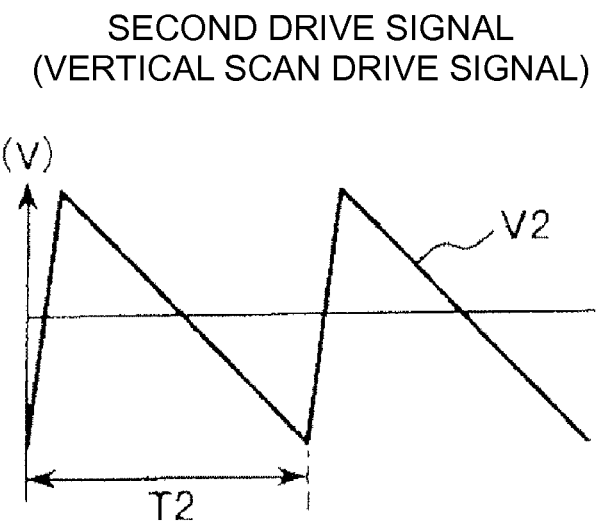
Figure 6:
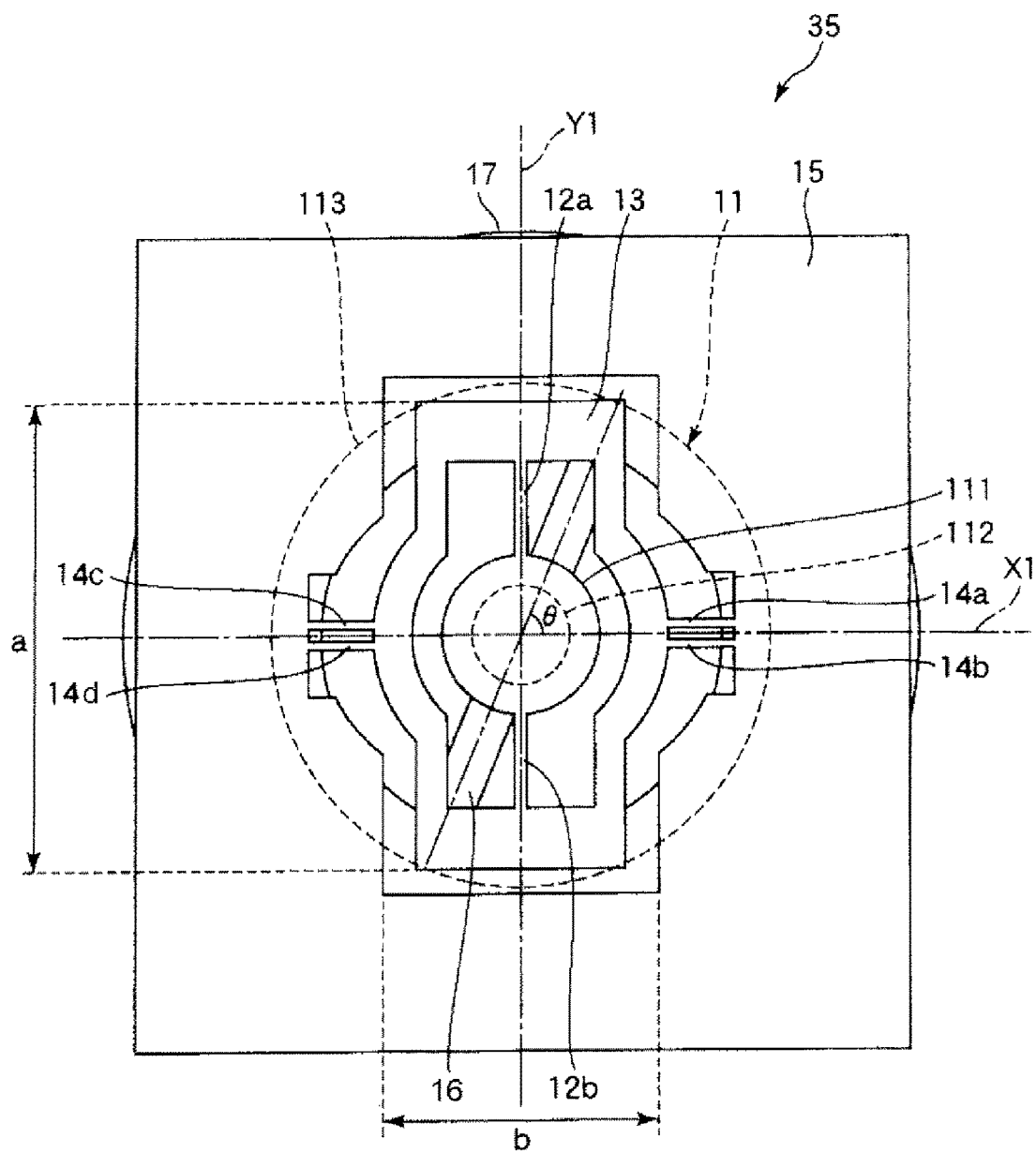
FIG. 6 is a plan view of a light scanning section shown in FIG. 4.
Figure 7:
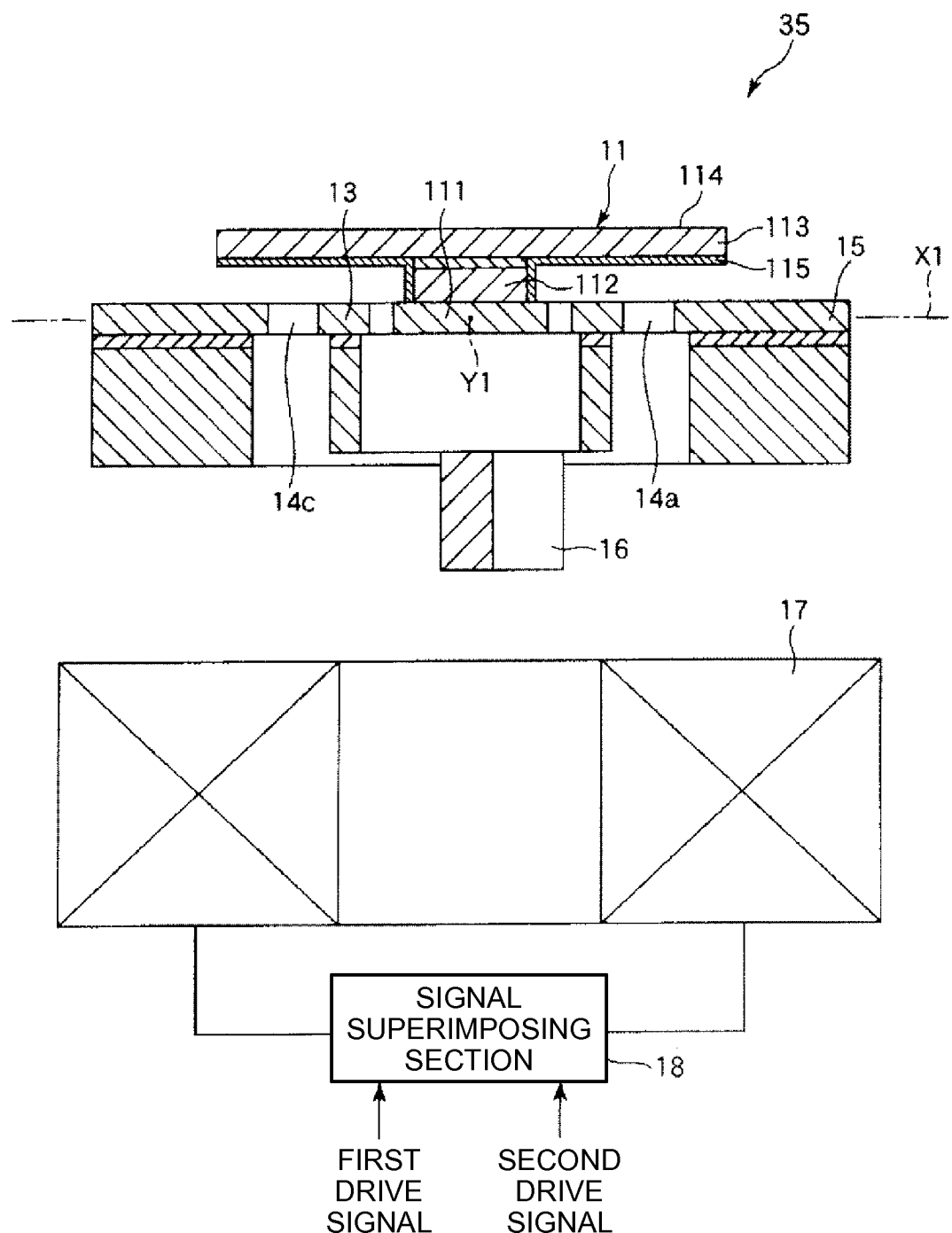
FIG. 7 is a cross-sectional view (a cross-sectional view along an X1 axis) of the light scanning section shown in FIG. 6.
Figure 8:
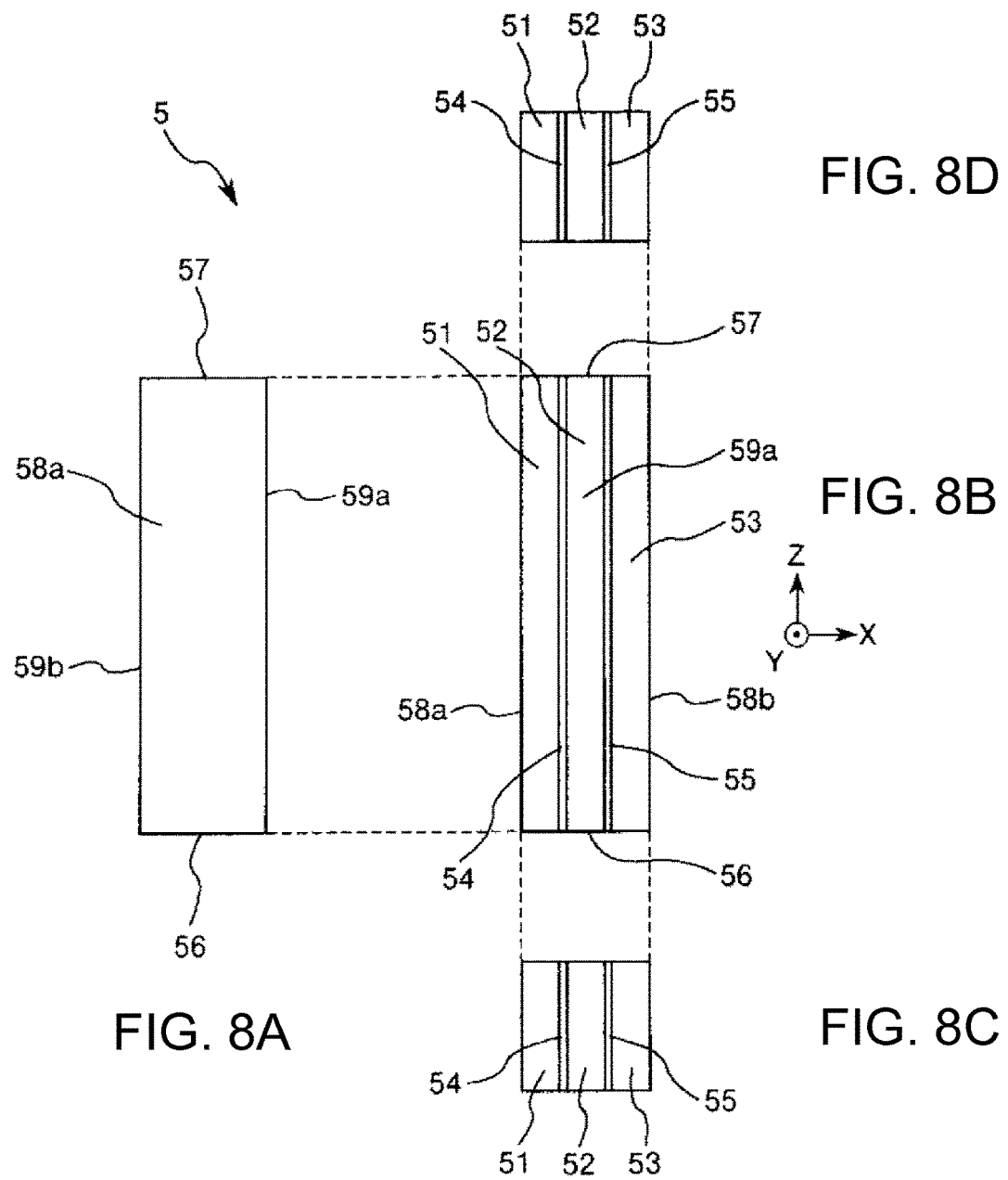
Figure 9:
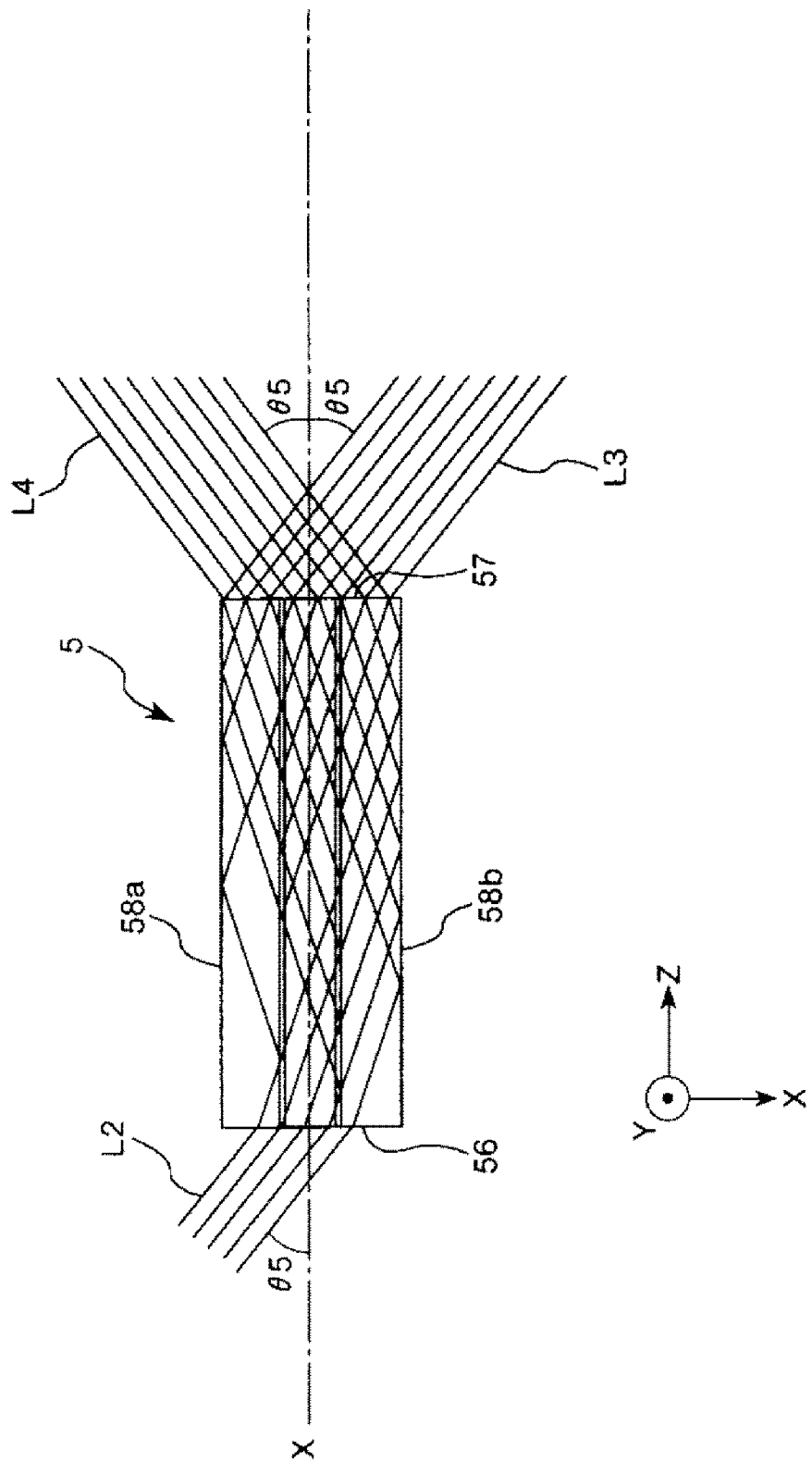
FIG. 9 is a diagram for explaining paths of the picture light beam having entered the optical element shown in FIGS. 8A through 8D.

FIG. 1 is a diagram showing a schematic configuration of a head-mounted display equipped with a virtual image display device according to a first embodiment, FIG. 2 is a schematic perspective view of the head-mounted display shown in FIG. 1, FIG. 3 is a diagram schematically showing a configuration of the virtual image display device shown in FIG. 1, FIG. 4 is a diagram schematically showing a configuration of an image generation section shown in FIG. 2, FIGS. 5A and 5B are diagrams each showing an example of a drive signal of a drive signal generation section shown in FIG. 4, FIG. 6 is a plan view of a light scanning section shown in FIG. 4, FIG. 7 is a cross-sectional view (a cross-sectional view along an X1 axis) of the light scanning section shown in FIG. 6, FIGS. 8A through 8D are diagrams showing a schematic configuration of an optical element shown in FIG. 3, wherein FIG. 8A is a front view, FIG. 8B is a plan view, FIG. 8C is a right side view, and FIG. 8D is a left side view, FIG. 9 is a diagram for explaining paths of the picture light beam having entered the optical element shown in FIGS. 8A through 8D, and FIGS. 10A and 10B are diagrams each for explaining paths of the picture light beam having entered the optical element shown in FIGS. 8A through 8D. Further, FIGS. 21A through 21D are diagrams showing another example of the optical element shown in FIG. 3, wherein FIG. 21A is a front view, FIG. 21B is a plan view, FIG. 21C is a right side view, and FIG. 21D is a left side view.

It should be noted that in FIGS. 1 through 3, 8A through 8D, and 9, there are shown X axis, Y axis, and Z axis as three axes perpendicular to each other, and the tip side of the arrow shown in the drawing is defined as a "+ (plus)" side and the base end side is defined as a "− (minus)" side for the sake of convenience of explanation. Further, a direction parallel to the X axis is referred to as an "X-axis direction," a direction parallel to the Y axis is referred to as a "Y-axis direction," and a direction parallel to the Z axis is referred to as a "Z-axis direction."

Here, the X axis, the Y axis, and the Z axis are set so that the X-axis direction corresponds to a side-to-side direction of the head H, the Y-axis direction corresponds to a top-to-bottom direction of the head H, and the Z-axis direction corresponds to a front-to-back direction of the head H when mounting the virtual image display device 1 on the head H of the observer.

As shown in FIG. 1, the head-mounted display (head-mounted virtual image display device) 10 equipped with the virtual image display device 1 according to the present embodiment has an exterior appearance like a pair of spectacles (eyeglasses), and is used while being mounted on the head H of the observer, and allows the user to visually recognize an image due to a virtual image in a state of overlapping the external image.

As shown in FIGS. 1 and 2, the head-mounted display 10 has the virtual image display device 1 including image generation sections 3, magnifying optical systems 4, and reflecting sections 6, and a frame 2.

In this head-mounted display 10, the image generation sections 3 form the picture light beam modulated based on a video signal, the magnifying optical systems 4 enlarge the light beam width (the cross-sectional area) of the picture light beam, and the reflecting sections 6 guide the picture light beam thus magnified by the magnifying optical systems 4 to the eyes EY of the observer. Thus, it is possible to allow the observer to visually recognize the virtual image corresponding to the video signal.

Further, in the head-mounted display 10, the image generation sections 3, the magnifying optical systems 4, and the reflecting sections 6 provided to the virtual image display device 1 are disposed on the right side and the left side of the frame 2, respectively, and are arranged so as to be symmetric (bilaterally symmetric) with reference to the Y-Z plane. The image generation section 3, the magnifying optical system 4, and the reflecting section 6 disposed on the right side of the frame 2 form a virtual image for the right eye, and the image generation section 3, the magnifying optical system 4, and the reflecting section 6 disposed on the left side of the frame 2 form a virtual image for the left eye.

It should be noted that although in the present embodiment, the head-mounted display 10 has a configuration of disposing the image generation section 3, the magnifying optical system 4, and the reflecting section 6 on each of the right side and the left side of the frame 2 to respectively form the virtual image for the right eye and the virtual image for the left eye, the invention is not limited to this configuration, but it is also possible to adopt a configuration of disposing the image generation section 3, the magnifying optical system 4, and the reflecting section 6 only on the left side of the frame 2 to form only the virtual image for the left eye. Further, for example, it is also possible to adopt a configuration of disposing the image generation section 3, the magnifying optical system 4, and the reflecting section 6 only on the right side of the frame 2 to form only the virtual image for the right eye. In other words, the head-mounted display according to the invention is not limited to the head-mounted display 10 of such a binocular type as in the present embodiment, but can also be a head-mounted display of a monocular type.

Hereinafter, each of the sections of the head-mounted display 10 will sequentially be explained in detail.

It should be noted that since the two image generation sections 3, the two magnifying optical systems 4, and the two reflecting sections 6 are each have the same configuration, the explanation will hereinafter be presented with a focus on the image generation section 3, the magnifying optical system 4, and the reflecting section 6 disposed on the left side of the frame 2.

Frame

As shown in FIG. 2, the frame 2 has a shape like an eyeglass frame, and has a function of supporting the image generation section 3, the magnifying optical system. 4, and the reflecting section 6 provided to the virtual image display device 1.

The frame 2 has a front section 21 including a rim 211 and a shade section 212, and temples 22 (earpieces) respectively extending from both of the right and left ends of the front section 21 in the Z-axis direction.

The shade section 212 is a member, which has a function of suppressing the transmission of the external light, and supports the reflecting section 6. The shade section 212 has a recessed section 27 opening toward the observer in the inside thereof, and the recessed section 27 is provided with the reflecting section 6. Further, the shade section 212 for supporting the reflecting section 6 is supported by the rim 211.

Further, in the central portion of the shade section 212, there is disposed a nose pad 23. The nose pad 23 has contact with the nose NS of the observer to support the head-mounted display 10 with respect to the head H of the observer when the observer wears the head-mounted display 10 on the head H.

The temples 22 are each a straight temple which is not angled so as to be hung on the ear EA of the observer, and is configured so that a part of the temple 22 has contact with the ear EA of the observer when the observer wears the head-mounted display 10 on the head H. Further, inside the temple 22, the image generation section 3 and the magnifying optical system 4 are housed.

Further, the constituent material of the temples 22 is not particularly limited, and a variety of resin materials, a composite material obtained by mixing fibers such as carbon fibers or glass fibers with resin, and a metal material such as aluminum or magnesium, for example, can be used.

It should be noted that the shape of the frame 2 is not limited to those shown in the drawings as long as the frame 2 can be mounted to the head H of the observer.

Virtual Image Display Device

As described above, the virtual image display device 1 has the image generation section 3, the magnifying optical system 4, and the reflecting section 6.

Each of the sections of the virtual image display device 1 according to the present embodiment will hereinafter be explained in detail.

Image Generation Section

As shown in FIG. 2, the image generation section 3 is incorporated in each of the temples 22 of the frame 2 described above.

As shown in FIGS. 3 and 4, the image generation section 3 is provided with a picture light generation section 31, a drive signal generation section 32, a control section 33, a lens 34, and a light scanning section 35.

Such an image generation section 3 has a function of generating the picture light beam modulated based on the video signal, and a function of generating a drive signal for driving the light scanning section 35.

Hereinafter, each of the sections of the image generation section 3 will be explained in detail.

Picture Light Generation Section

The picture light generation section 31 is for generating the picture light beam L1 with which the light scanning section 35 (a light scanner) performs scanning (light scanning).

The picture light generation section 31 has a light source section 311 including a plurality of light sources (light source sections) 311R, 311G, and 311B different in wavelength from each other, a plurality of drive circuits 312R, 312G, and 312B, and a light combining section (combining section) 313.

Among the light sources included in the light source section 311, the light source 311R (R light source) is for emitting a red light beam, the light source 311G (G light source) is for emitting a green light beam, and the light source 311B is for emitting a blue light beam. By using such light beams of three colors, a full color image can be displayed.

As each of the light sources 311R, 311G, and 311B, for example, a laser diode or an LED can be used although not particularly limited.

Such light sources 311R, 311G, and 311B are electrically connected to the drive circuits 312R, 312G, and 312B, respectively.

The drive circuit 312R has a function of driving the light source 311R described above, the drive circuit 312G has a function of driving the light source 311G described above, and the drive circuit 312B has a function of driving the light source 311B described above.

The three (three colors of) light beams (the picture light beams) respectively emitted from the light sources 311R, 311G, and 311B driven by such drive circuits 312R, 312G, and 312B enter the light combining section 313.

The light combining section 313 is for combining the light beams from the plurality of light sources 311R, 311G, and 311B with each other.

In the present embodiment, the light combining section 313 has two dichroic mirrors 313a, 313b.

The dichroic mirror 313a has a function of transmitting the red light beam and reflecting the green light beam. Further, the dichroic mirror 313b has a function of transmitting the red light beam and the green light beam, and reflecting the blue light beam.

By using such dichroic mirrors 313a, 313b, the three colors of light beams, namely the red light beam, the green light beam, and the blue light beam from the light sources 311R, 311G, and 311B, are combined with each other to form a single picture light beam L1.

Here, in the present embodiment, the light source section 311 described above is disposed so that the light path lengths of the red light beam, the green light beam, and the blue light beam from the respective light sources 311R, 311G, and 311B are equal to each other.

It should be noted that the light combining section 313 is not limited to the configuration of using the dichroic mirrors described above, but can also be formed of, for example, prisms, optical waveguides, or optical fibers.

In the picture light generation section 31 having such a configuration as described above, the three colors of picture light beams are generated by the light source section 311, and then such picture light beams are combined by the light combining section 313 to thereby generate the single picture light beam L1. Further, the picture light beam L1 generated by the picture light generation section 31 proceeds toward the lens 34.

It should be noted that the picture light generation section 31 described above can also be provided with, for example, a light detection device (not shown) for detecting the intensity and so on of the picture light beam L1 generated in the light sources 311R, 311G, and 311B. By providing such a light detection device, it is possible to adjust the intensity of the picture light beam L1 in accordance with the detection result.

Lens

The picture light beam L1 generated by the picture light generation section 31 enters the lens 34.

The lens 34 has a function of controlling the radiation angle of the picture light beam L1. The lens 34 is, for example, a collimator lens. The collimator lens is a lens for adjusting (modulating) a light beam into a light beam in a parallel state.

In such a lens 34, the picture light beam L1 having been emitted from the picture light generation section 31 is transmitted to the light scanning section 35 in the collimated state.

Drive Signal Generation Section

The drive signal generation section 32 is for generating the drive signal for driving the light scanning section 35 (the light scanner).

The drive signal generation section 32 has a drive circuit 321 (a first drive circuit) for generating a first drive signal used for the scanning (horizontal scanning) in a first direction of the light scanning section 35 and a drive circuit 322 (a second drive circuit) for generating a second drive signal used for the scanning (vertical scanning) in a second direction perpendicular to the first direction of the light scanning section 35.

For example, the drive circuit 321 is for generating the first drive signal V1 (a horizontal scanning voltage) periodically varying with a period T1 as shown in FIG. 5A, and the drive circuit 322 is for generating the second drive signal V2 (a vertical scanning voltage) periodically varying with a period T2 different from the period T1 as shown in FIG. 5B.

It should be noted that the first drive signal and the second drive signal will be described later in detail together with the explanation of the light scanning section 35 described later.

The drive signal generation section 32 described above is electrically connected to the light scanning section 35 via signal lines not shown. Thus, the drive signals (the first drive signal and the second drive signal) generated in the drive signal generation section 32 is input to the light scanning section 35.

Control Section

The drive circuits 312R, 312G, and 312B of the picture light generation section 31 and the drive circuits 321, 322 of the drive signal generation section 32 described above are electrically connected to the control section 33. The control section 33 has a function of controlling the drive of the drive circuits 312R, 312G, and 312B of the picture light generation section 31 and the drive circuits 321, 322 of the drive signal generation section 32 based on the video signal (the image information).

Based on the command of the control section 33, the picture light generation section 31 generates the picture light beam L1 modulated in accordance with the image information, and the drive signal generation section 32 generates the drive signal corresponding to the image information.

Light Scanning Section

The picture light beam L1 having been emitted from the picture light generation section 31 enters the light scanning section 35 via the lens 34.

The light scanning section 35 is alight scanner for performing two-dimensional scanning with the picture light beam L1 from the picture light generation section 31. The light scanning section 35 performs scanning with the picture light beam L1 to thereby form a scanning light beam (a picture light beam) L2.

As shown in FIG. 6, the light scanning section 35 is provided with a movable mirror section 11, a pair of shaft sections 12a, 12b (first shaft sections), a frame body section 13, two pairs of shaft sections 14a, 14b, 14c, and 14d (second shaft sections), a support section 15, a permanent magnet 16, and a coil 17. In other words, the light scanning section 35 has a so-called gimbal structure.

Here, the movable mirror section 11 and the pair of shaft sections 12a, 12b constitute a first vibration system oscillating (making forward-reverse rotation) around a Y1 axis (a first axis). Further, the movable mirror section 11, the pair of shaft sections 12a, 12b, the frame body section 13, the two pairs of shaft sections 14a, 14b, 14c, and 14d, and the permanent magnet 16 constitute a second vibration system oscillating (making forward-reverse rotation) around an X1 axis (a second axis).

Further, the light scanning section 35 has a signal superimposing section 18 (see FIG. 7), and the permanent magnet 16, the coil 17, the signal superimposing section 18, and the drive signal generation section 32 constitute a drive section for driving (i.e., oscillating the movable mirror section 11 around the X1 axis and the Y1 axis) the first vibration system and the second vibration system described above.

Hereinafter, each of the sections of the light scanning section 35 will sequentially be explained in detail.

The movable mirror section 11 has a base section 111 (movable section), and a light reflecting plate 113 fixed to the base section 111 via a spacer 112.

On the upper surface (one surface) of the light reflecting plate 113, there is disposed a light reflecting section 114 having light reflectivity.

The light reflecting plate 113 is disposed so as to be separated from the shaft sections 12a, 12b in the thickness direction, and overlap the shaft sections 12a, 12b when viewed from the thickness direction (hereinafter also referred to as a "planar view").

Therefore, it is possible to increase the area of the plate surface of light reflecting plate 113 while decreasing the distance between the shaft section 12a and the shaft section 12b. Further, since the distance between the shaft section 12a and the shaft section 12b can be shortened, miniaturization of the frame body section 13 can be achieved. Further, since the miniaturization of the frame body section 13 can be achieved, it is possible to shorten the distance between the shaft sections 14a, 14b and the shaft sections 14c, 14d.

Therefore, even in the case of increasing the area of the plate surface of the light reflecting plate 113, the miniaturization of the light scanning section 35 can be achieved. In other words, the size of the light scanning section 35 with respect to the area of the light reflecting section 114 can be decreased.

Further, the light reflecting plate 113 is formed so as to cover the entirety of the shaft sections 12a, 12b in the planar view. In other words, the shaft sections 12a, 12b are each located inside the outer circumference of the light reflecting plate 113 in the planar view. Thus, the area of the plate surface of the light reflecting plate 113 increases, and as a result, the area of the light reflecting section 114 can be enlarged. Further, it is possible to prevent unwanted light from being reflected by the shaft sections 12a, 12b to become stray light.

Further, the light reflecting plate 113 is formed so as to cover the entirety of the frame body section 13 in the planar view. In other words, the frame body section 13 is located inside the outer circumference of the light reflecting plate 113 in the planar view. Thus, the area of the plate surface of the light reflecting plate 113 increases, and as a result, the area of the light reflecting section 114 can be enlarged.

Further, it is possible to prevent unwanted light from being reflected by the frame body section 13 to become stray light.

Further, the light reflecting plate 113 is formed so as to cover the entirety of the shaft sections 14a, 14b, 14c, and 14d in the planar view. In other words, the shaft sections 14a, 14b, 14c, and 14d are each located inside the outer circumference of the light reflecting plate 113 in the planar view. Thus, the area of the plate surface of the light reflecting plate 113 increases, and as a result, the area of the light reflecting section 114 can be enlarged. Further, it is possible to prevent unwanted light from being reflected by the shaft sections 14a, 14b, 14c, and 14d to become stray light.

In the present embodiment, the light reflecting plate 113 has a circular shape in the planar view. It should be noted that the planar-view shape of the light reflecting plate 113 is not limited thereto, but can also be, for example, an elliptical shape or a polygonal shape such as a quadrangular shape.

As shown in FIG. 7, on the lower surface (the other surface) of such a light reflecting plate 113, there is disposed a hard layer 115.

The hard layer 115 is formed of a harder material than the constituent material of a main body of the light reflecting plate 113. Thus, the rigidity of the light reflecting plate 113 can be enhanced. Therefore, it is possible to prevent or suppress the deflection of the light reflecting plate 113 in the oscillating movement. Further, it is possible to suppress the inertia moment of the light reflecting plate 113 around the X1 axis and the Y1 axis in the oscillating movement by decreasing the thickness of the light reflecting plate 113.

The constituent material of such a hard layer 115 is not particularly limited as long as the material is harder than the constituent material of the main body of the light reflecting plate 113. For example, diamond, a carbon nitride film, quartz crystal, sapphire, lithium tantalate, and potassium niobate can be used, and in particular, diamond is preferably used.

The thickness (in average) of the hard layer 115 is not particularly limited, but is preferably in a range of about 1 through 10 μm, and is further preferably in a range of about 1 through 5 μm.

Further, the hard layer 115 can be formed of a single layer, or can be formed of a laminated body of a plurality of layers. It should be noted that the hard layer 115 is provided as desired, and can also be eliminated.

Such a hard layer 115 can be formed using, for example, a chemical vapor deposition (CVD) process such as a plasma CVD process, a thermal CVD process or a laser CVD process, a dry plating process such as a vacuum deposition process, a sputtering process or an ion plating process, a wet plating process such as an electrolytic plating process, an immersion plating process or an electroless plating process, a thermal spraying process, or bonding of a sheet member.

Further, the lower surface of the light reflecting plate 113 is fixed to the base section 111 via the spacer 112. Thus, it is possible to oscillate the light reflecting plate 113 around the Y1 axis while preventing the contact with the shaft sections 12a, 12b, the frame body section 13, and the shaft sections 14a, 14b, 14c, and 14d.

Further, the base section 111 is located inside the outer circumference of the light reflecting plate 113 in the planar view. In other words, the area of the surface (plate surface), on which the light reflecting section 114 is disposed, of the light reflecting plate 113 is larger than the area of the surface, to which the spacer 112 is fixed, of the base section 111. Further, the area of the base section 111 in the planar view is preferably as small as possible providing the base section 111 can support the light reflecting plate 113 via the spacer 112. Thus, it is shorten the distance between the shaft section 12a and the shaft section 12b while increasing the area of the plate surface of the light reflecting plate 113.

As shown in FIG. 6, the frame body section 13 has a frame-like shape, and is disposed surrounding the base section 111 of the movable mirror section 11 described above. In other words, the base section 111 of the movable mirror section 11 is disposed inside the frame body section 13 having a frame-like shape.

Further, the frame body section 13 is supported by the support section 15 via the shaft sections 14a, 14b, 14c, and 14d. Further, the base section 111 of the movable mirror section 11 is supported by the frame body section 13 via the shaft sections 12a, 12b.

Further, the frame body section 13 is arranged to have a length in a direction along the Y1 axis longer than a length in a direction along the X1 axis. In other words, assuming that the length of the frame body section 13 in the direction along the Y1 axis is "a," and the length of the frame body section 13 in the direction along the X1 axis is "b," the relationship of a>b is satisfied. Thus, it is possible to suppress an increase in the length of the light scanning section 35 in the direction along the X1 axis while ensuring the necessary length for the shaft sections 12a, 12b.

Further, the frame body section 13 forms a shape along the outer shape of the structure formed of the base section 111 of the movable mirror section 11 and the pair of shaft sections 12a, 12b in the plan view. Thus, the miniaturization of the frame body section 13 can be achieved while allowing the vibration of the first vibration system constituted by the movable mirror section 11 and the pair of shaft sections 12a, 12b, namely the oscillation of the movable mirror section 11 around the Y1 axis.

It should be noted that the shape of the frame body section 13 is not limited to the shape shown in the drawings as long as the shape is a frame-like shape surrounding the base section 111 of the movable mirror section 11.

The shaft sections 12a, 12b connect the movable mirror section 11 and the frame body section 13 to each other so as to allow the movable mirror section 11 to rotate (oscillate) around the Y1 axis (the first axis). Further, the shaft sections 14a, 14b, 14c, and 14d connect the frame body section 13 and the support section 15 to each other so as to allow the frame body section 13 to rotate (oscillate) around the X1 axis (the second axis) perpendicular to the Y1 axis.

The shaft sections 12a, 12b are disposed so as to be opposed to each other via the base section 111 of the movable mirror section 11. Further, the shaft sections 12a, 12b each have an elongated shape extending in a direction along the Y1 axis. Further, the shaft sections 12a, 12b each have one end portion connected to the base section 111, and the other end portion connected to the frame body section 13. Further, the shaft sections 12a, 12b are each disposed so that the center axis coincides with the Y1 axis.

Such shaft sections 12a, 12b are each torsionally deformed due to the oscillating movement of the movable mirror section 11 around the Y1 axis.

The shaft sections 14a, 14b and the shaft sections 14c, 14d are disposed so as to be opposed to each other via (across) the frame body section 13. Further, the shaft sections 14a, 14b, 14c, and 14d each have an elongated shape extending in a direction along the X1 axis. Further, the shaft sections 14a, 14b, 14c, and 14d each have one end portion connected to the frame body section 13, and the other end portion connected to the support section 15. Further, the shaft sections 14a, 14b are disposed so as to be opposed to each other via the X1 axis, and similarly, the shaft sections 14c, 14d are disposed so as to be opposed to each other via the X1 axis.

In such shaft sections 14a, 14b, 14c, and 14d, the entirety of the shaft sections 14a, 14b and the entirety of the shaft sections 14c, 14d are each torsionally deformed due to the oscillating movement of the frame body section 13 around the X1 axis.

By arranging that the movable mirror section 11 can oscillate around the Y1 axis, and at the same time, the frame body section 13 can oscillate around the X1 axis as described above, it is possible to oscillate (make forward-reverse rotation of) the movable mirror section 11 around the two axes, namely the X1 axis and the Y1 axis.

Further, although not shown in the drawings, at least one of such shaft sections 12a, 12b and at least one of the shaft sections 14a, 14b, 14c, and 14d are each provided with an angle detection sensor such as a distortion sensor. The angle detection sensor is capable of detecting angular information of the light scanning section 35, more specifically, an oscillation angle of the light reflecting section 114 around the X1 axis and an oscillation angle of the light reflecting section 114 around the Y1 axis. The detection result is input to the control section 33 via cables not shown.

It should be noted that the shapes of the shaft sections 12a, 12b and the shaft sections 14a, 14b, 14c, and 14d are not limited to those described above, but can also be provided with, for example, a bent or curved portion or a branched portion disposed at least one place in the middle.

The base section 111, the shaft sections 12a, 12b, the frame body section 13, the shaft sections 14a, 14b, 14c, and 14d, and the support section 15 described above are formed integrally.

In the present embodiment, the base section 111, the shaft sections 12a, 12b, the frame body section 13, the shaft sections 14a, 14b, 14c, and 14d, and the support section 15 are formed by etching an SOI substrate obtained by stacking a first Si layer (a device layer), an $SiO_2$ layer (a box layer), a second Si layer (a handle layer) in this order. Thus, the vibration characteristics of the first vibration system and the second vibration system can be made excellent. Further, since microfabrication can be performed on the SOI substrate by etching, by forming the base section 111, the shaft sections 12a, 12b, the frame body section 13, the shaft sections 14a, 14b, 14c, and 14d, and the support section 15 using the SOI substrate, the dimensional accuracy of these sections can be made excellent, and further, the miniaturization of the light scanning section 35 can be achieved.

Further, the base section 111, the shaft sections 12a, 12b, and the shaft sections 14a, 14b, 14c, and 14d are each formed of the first Si layer of the SOI substrate. Thus, the shaft sections 12a, 12b and the shaft sections 14a, 14b, 14c, and 14d can be made excellent in elasticity. Further, it is possible to prevent the base section 111 from having contact with the frame body section 13 when rotating around the Y1 axis.

Further, the frame body section 13 and the support section 15 are each formed of a laminated body including the first Si layer, the $SiO_2$ layer and the second Si layer of the SOI substrate. Thus, it is possible to make the rigidity of the frame body section 13 and the support section 15 excellent. Further, the $SiO_2$ layer and the second Si layer of the frame body section 13 has not only the function as a rib for enhancing the rigidity of the frame body section 13, but also the function of preventing the movable mirror section 11 from having contact with the permanent magnet 16.

Further, it is preferable that an antireflection treatment is provided to the upper surface of the support section 15. Thus, it is possible to prevent the unwanted light applied to the support section 15 from becoming the stray light.

Such an antireflection treatment is not particularly limited, but there can be cited, for example, formation of an antireflection film (a dielectric multilayer film), a surface roughening process, and a blackening process.

It should be noted that the constituent materials and the forming method of the base section 111, the shaft sections 12a, 12b, and the shaft sections 14a, 14b, 14c, and 14d are illustrative only, and the invention is not limited thereto.

Further, in the present embodiment, the spacer 112 and the light reflecting plate 113 are also formed by etching the SOI substrate. Further, the spacer 112 is formed of the laminated body including the $SiO_2$ layer and the second Si layer of the SOI substrate. Further, the light reflecting plate 113 is formed of the first Si layer of the SOI substrate.

By forming the spacer 112 and the light reflecting plate 113 using the SOI substrate as described above, the spacer 112 and the light reflecting plate 113 bonded to each other can easily and accurately be manufactured.

Such a spacer 112 is bonded to the base section 111 with a bonding material (not shown) such as an adhesive or a brazing material.

On the lower surface (the surface on the opposite side to the light reflecting plate 113) of the frame body section 13 described above, there is bonded the permanent magnet 16.

The method of bonding the permanent magnet 16 and the frame body section 13 to each other is not particularly limited, and a bonding method using, for example, an adhesive can be used.

The permanent magnet 16 is magnetized in a direction oblique to both of the X1 axis and the Y1 axis in the planar view.

In the present embodiment, the permanent magnet 16 has an elongated shape (a rod-like shape), and is disposed along a direction oblique to both of the X1 axis and the Y1 axis. Further, the permanent magnet 16 is magnetized in the longitudinal direction thereof. In other words, the permanent magnet 16 is magnetized so that one end portion is the south pole, and the other end portion is the north pole.

Further, the permanent magnet 16 is disposed so as to be symmetric about the intersection between the X1 axis and the Y1 axis in the planar view.

It should be noted that although in the present embodiment, the case of providing the frame body section 13 with a single permanent magnet is explained as an example, the invention is not limited thereto, but for example, two permanent magnets can also be provided to the frame body section 13. In this case, for example, it is sufficient to make the two permanent magnets each having an elongated shape opposed to each other in plan view via the base section 111, and at the same time, dispose the two permanent magnet to the frame body section 13 so as to be parallel to each other.

The tilt angle θ of the magnetization direction (extending direction) of the permanent magnet 16 with respect to the X1 axis is not particularly limited, but is preferably no smaller than 30° and no larger than 60°, more preferably no smaller than 45° and no larger than 60°, and further more preferably equal to 45°. By disposing the permanent magnet 16 in such a manner, the movable mirror section 11 can smoothly and reliably be rotated around the X1 axis.

As such a permanent magnet 16, a neodymium magnet, a ferrite magnet, a samarium-cobalt magnet, an alnico magnet, a bond magnet, for example, can preferably be used. Such a permanent magnet 16 is obtained by magnetizing a hard magnetic material, and can be formed by, for example, installing the hard magnetic material not magnetized in the frame body section 13, and then magnetizing the hard magnetic material. This is because in the case of attempting to install the permanent magnet 16 having already been magnetized to the frame body section 13, the permanent magnet 16 fails to be installed at the desired position in some cases due to an influence of an external magnetic field or a magnetic field of other components.

The coil 17 is disposed immediately beneath such a permanent magnet 16. In other words, the coil 17 is disposed so as to be opposed to the lower surface of the frame body section 13. Thus, it is possible to efficiently act the magnetic field generated by the coil 17 on the permanent magnet 16. Thus, a reduction in power consumption and miniaturization of the light scanning section 35 can be achieved.

Such a coil 17 is electrically connected to the signal superimposing section 18 (see FIG. 7).

Further, by the signal superimposing section 18 applying a voltage to the coil 17, the magnetic field having a flux perpendicular to the X1 axis and the Y1 axis is generated from the coil 17.

The signal superimposing section 18 has an adder (not shown) for superimposing the first drive signal V1 and the second drive signal V2 described above on each other to apply the voltage thus superimposed to the coil 17.

Here, the first drive signal V1 and the second drive signal V2 will be described in detail.

As described above, the drive circuit 321 is for generating the first drive signal V1 (a horizontal scanning voltage) periodically varying with the period T1 as shown in FIG. 5A. In other words, the drive circuit 321 is for generating the first drive signal V1 with a first frequency (1/T1).

The first drive signal V1 has a waveform like a sinusoidal wave. Therefore, the light scanning section 35 can effectively perform the main scanning with the light. It should be noted that the waveform of the first drive signal V1 is not limited thereto.

Further, the first frequency (1/T1) is not particularly limited providing the frequency is suitable for the horizontal scanning, but is preferably in a range of 10 through 40 kHz.

In the present embodiment, the first frequency is set to be equal to a torsional resonance frequency (f1) of a first vibration system (a torsional vibration system) constituted by the movable mirror section 11 and the pair of shaft sections 12a, 12b. In other words, the first vibration system is designed (manufactured) so that the torsional resonance frequency f1 thereof becomes a frequency suitable for the horizontal scanning. Thus, it is possible to enlarge the rotational angle of the movable mirror section 11 around the Y1 axis.

Incidentally, as described above, the drive circuit 322 is for generating the second drive signal V2 (a vertical scanning voltage) periodically varying with the period T2 different from the period T1 as shown in FIG. 5B. In other words, the drive circuit 322 is for generating the second drive signal V2 with a second frequency (1/T2).

The second drive signal V2 has a waveform like a saw-tooth wave. Therefore, the light scanning section 35 can effectively perform the vertical scanning (sub-scanning) with the light. It should be noted that the waveform of the second drive signal V2 is not limited thereto.

The second frequency (1/T2) is not particularly limited providing the frequency is different from the first frequency (1/T1), and is suitable for the vertical scanning, but is preferably in a range of 30 through 80 Hz (around 60 Hz). By setting the frequency of the second drive signal V2 to around 60 Hz and setting the frequency of the first drive signal V1 in a range of 10 through 40 kHz as described above, it is possible to rotate the movable mirror section 11 around each of the two axes (i.e., the X1 axis and the Y1 axis) perpendicular to each other with respective frequencies suitable for the drawing in the display. However, as long as the movable mirror section 11 can be rotated around each of the X1 axis and the Y1 axis, the combination of the frequency of the first drive signal V1 and the frequency of the second drive signal V2 is not particularly limited.

In the present embodiment, the frequency of the second drive signal V2 is adjusted to be a frequency different from the torsional resonance frequency (the resonance frequency) of the second vibration system (the torsional vibration system) constituted by the movable mirror section 11, the pair of shaft sections 12a, 12b, the frame body section 13, the two pairs of shaft sections 14a, 14b, 14c, and 14d, and the permanent magnet 16.

It is preferable for the frequency (the second frequency) of such a second drive signal V2 to be lower than the frequency (the first frequency) of the first drive signal V1. In other words, it is preferable for the period T2 to be longer than the period T1. Thus, it is possible to more surely and more smoothly rotate the movable mirror section 11 around the X1 axis with the second frequency while rotating the movable mirror section 11 around the Y1 axis with the first frequency.

Further, assuming that the torsional resonance frequency of the first vibration system is f1 (Hz), and the torsional resonance frequency of the second vibration system is f2 (Hz), the resonance frequencies f1 and f2 preferably fulfill the relationship of f2<f1, and more preferably fulfill the relationship of f1≥f2. Thus, it is possible to more smoothly rotate the movable mirror section 11 around the X1 axis with the frequency of the second drive signal V2 while rotating the movable mirror section 11 around the Y1 axis with the frequency of the first drive signal V1. In contrast, in the case in which the relationship of f1≤f2 is satisfied, there is a possibility that the vibration of the first vibration system with the second frequency occurs.

Next, a method of driving the light scanning section 35 will be explained. It should be noted that as described above, in the present embodiment, the frequency of the first drive signal V1 is set to be equal to the torsional resonance frequency of the first vibration system, and the frequency of the second drive signal V2 is set to a value, which is different from the torsional resonance frequency of the second vibration system, and is lower than the frequency of the first drive signal V1 (e.g., the frequency of the first drive signal V1 is set to 18 kHz, and the frequency of the second drive signal V2 is set to 60 Hz).

For example, the first drive signal V1 shown in FIG. 5A and the second drive signal V2 shown in FIG. 5B are superimposed in the signal superimposing section 18 on each other, and then, the voltage thus superimposed is applied to the coil 17.

Then, the magnetic field (the magnetic field is referred to as a "magnetic field A1") acting to attract the one end portion (the north pole) of the permanent magnet 16 to the coil 17 and at the same time acting to separate the other end portion (the south pole) of the permanent magnet 16 from the coil 17, and the magnetic field (the magnetic field is referred to as a "magnetic field A2") acting to separate the one end portion (the north pole) of the permanent magnet 16 from the coil 17 and at the same time acting to attract the other end portion (the south pole) of the permanent magnet 16 to the coil 17 are switched alternately due to the first drive signal V1.

Here, as described above, the permanent magnet 16 is disposed so that the end portions (the magnetic poles) are located in the respective two areas divided by the Y1 axis. Specifically, the north pole of the permanent magnet 16 is located on one side and the south pole of the permanent magnet 16 is located on the other side across the Y1 axis in the planar view of FIG. 6. Therefore, by the magnetic field A1 and the magnetic field A2 being switched alternately, the vibration having a torsional vibration component around the Y1 axis is excited in the frame body section 13, and the movable mirror section 11 rotates around the Y1 axis with the frequency of the first drive signal V1 while torsionally deforming the shaft sections 12a, 12b due to the vibration.

Further, the frequency of the first drive signal V1 is equal to the torsional resonance frequency of the first vibration system. Therefore, the movable mirror section 11 can efficiently be rotated around the Y1 axis using the first drive signal V1. Therefore, even in the case in which the vibration having the torsional vibration component of the frame body section 13 around the Y1 axis described above is small, the rotational angle of the movable mirror section 11 around the Y1 axis due to the vibration can be increased.

Meanwhile, the magnetic field (the magnetic field is referred to as a "magnetic field B1") acting to attract the one end portion (the north pole) of the permanent magnet 16 to the coil 17 and at the same time acting to separate the other end portion (the south pole) of the permanent magnet 16 from the coil 17, and the magnetic field (the magnetic field is referred to as a "magnetic field B2") acting to separate the one end portion (the north pole) of the permanent magnet 16 from the coil 17 and at the same time acting to attract the other end portion (the south pole) of the permanent magnet 16 to the coil 17 are switched alternately due to the second drive signal V2.

Here, as described above, the permanent magnet 16 is disposed so that the end portions (the magnetic poles) are located in the respective two areas divided by the X1 axis. Specifically, the north pole of the permanent magnet 16 is located on one side and the south pole of the permanent magnet 16 is located on the other side across the X1 axis in the planar view of FIG. 6. Therefore, by the magnetic field B1 and the magnetic field B2 being switched alternately, the frame body section 13 rotates around the X1 axis with the frequency of the second drive signal V2 together with the movable mirror section 11 while torsionally deforming each of the shaft sections 14a, 14b and the shaft sections 14c, 14d.

Further, the frequency of the second drive signal V2 is set to be extremely lower compared to the frequency of the first drive signal V1. Further, the torsional resonance frequency of the second vibration system is designed to be lower than the torsional resonance frequency of the first vibration system. Therefore, the movable mirror section 11 can be prevented from rotating around the Y1 axis with the frequency of the second drive signal V2.

According to such a light scanning section 35 as explained hereinabove, since the movable mirror section 11 provided with the light reflecting section 114 having the light reflectivity is oscillated around each of the two axes perpendicular to each other, miniaturization and weight reduction of the light scanning section 35 can be achieved. As a result, the virtual image display device 1 more excellent in usability for the observer can be obtained.

In particular, since the light scanning section 35 has the gimbal structure, the configuration (the light scanning section 35) of performing the two-dimensional scanning with the picture light beam can be further miniaturized.

Magnifying Optical System 4

As shown in FIG. 3, the scanning light beam (the picture light beam) L2 moved by the light scanning section 35 described above to perform the scanning is transmitted to the magnifying optical system 4.

The magnifying optical system 4 has a function of enlarging the light beam width of the picture light beam L2 moved by the light scanning section 35 to perform the scanning, namely magnifying the cross-sectional area of the picture light beam L2.

As shown in FIG. 3, the magnifying optical system 4 is provided with an optical element 5, a correction lens 42, and a light blocking plate 43.

Hereinafter, each of the sections of the magnifying optical system 4 will sequentially be explained in detail.

Optical Element 5

As shown in FIG. 3, the optical element 5 is disposed in the vicinity of the light scanning section 35, and has light permeability (a light transmissive property), and has an elongated shape along the Z-axis direction.

The picture light beam L2 moved by the light scanning section 35 described above to perform the scanning enters the optical element 5.

The optical element 5 is for magnifying the light beam width (the cross-sectional area) of the picture light beam L2 moved by the light scanning section 35 to perform the scanning. Specifically, the optical element 5 is for propagating the picture light beam L2, which has been moved by the light scanning section 35 to perform the scanning, in the Z-axis direction while multiply reflecting the picture light beam L2 inside the optical element 5 to thereby magnify the light beam width of the picture light beam L2, and then emit picture light beams L3, L4 larger in light beam width than the picture light beam L2.

As shown in FIGS. 8A through 8D, the optical element 5 has a plane of incidence 56 and an exit surface 57 at one ends in the longitudinal direction (the Z-axis direction) thereof, and these surfaces (the plane of incidence 56 and the exit surface 57) are opposed to each other. Further, the optical element 5 has side surfaces 58a, 58b opposed to each other in the thickness direction (the X-axis direction), and side surfaces 59a, 59b opposed to each other in the width direction (the Y-axis direction).

Further, the plane of incidence 56 is disposed so as to face the light scanning section 35, and the exit surface 57 is disposed so as to face the side of the correction lens 42 and the light blocking plate 43 (see FIG. 3).

The plane of incidence 56 is a surface having light permeability, to which the picture light beam L2 moved by the light scanning section 35 to perform the scanning is input. In contrast, the exit surface 57 is a surface having light permeability, from which the picture light beam L2 having been input through the plane of incidence 56 is emitted as the picture light beams L3, L4.

Further, the side surfaces 58a, 58b are each a total reflection surface, and totally reflect the picture light beam L2 having entered the optical element 5. Here, the total reflection surface includes not only a surface with the light transmission of 0%, but also a surface slightly transmitting the light, for example, a surface with the light transmission lower than 3%.

Further, the side surface 59a and the side surface 59b each can also be a surface with any light transmission, for example, a total reflection surface or a semi-reflecting surface, but in particular, surfaces with relatively low light transmission are preferable. Thus, it is possible to prevent the light inside the optical element 5 from becoming the stray light. Further, as a method of preventing the light inside the optical element 5 from becoming the stray light, there can be cited, for example, a method of roughening the side surface 59a and the side surface 59b.

Further, as shown in FIGS. 8A through 8D, the plane of incidence 56 and the exit surface 57 are parallel to each other. Further, the side surface 58a and the side surface 58b are parallel to each other. Further, the side surface 59a and the side surface 59b are parallel to each other. Therefore, in the present embodiment, the overall shape of the optical element 5 is a rectangular parallelepiped.

It should be noted that the term "parallel" described above includes the case in which, for example, the angle formed between the surfaces is in a range of about ±2° besides the case in which the surfaces are perfectly parallel to each other.

Further, although in the present embodiment, the plane of incidence 56 and the exit surface 57 are parallel to each other, the plane of incidence 56 and the exit surface 57 are not necessarily required to be parallel to each other, and can have respective tilt angles equal in absolute value to each other. The phrase "the plane of incidence 56 and the exit surface 57 have respective tilt angles equal in absolute value to each other" denotes the inclusion of the state in which, for example, the plane of incidence 56 is tilted at an acute angle α (e.g., +20°) toward the +Z-axis direction with respect to the X-Y plane, and the exit surface 57 is tilted at an acute angle α (e.g., −20°) toward the −Z-axis direction with respect to the X-Y plane. In other words, the phrase denotes the inclusion of the case in which the plane of incidence 56 and the exit surface 57 form an upward tapered shape (drawing) as shown in FIGS. 21A through 21D. Further, the phrase "to have respective tilt angles equal in absolute value to each other" described above includes the case in which, for example, the absolute values of the tilt angles are different as much as about 2° from each other besides the case in which the absolute values are perfectly equal to each other.

Further, the side surface 59a and the side surface 59b are parallel to each other in the present embodiment, but are not required to be parallel to each other, and can be different in tilt angle from each other.

Further, the thickness (the length in the X-axis direction) of the optical element 5 is preferably no smaller than 0.1 mm and no larger than 100 mm, and more preferably no smaller than 0.3 mm and no larger than 50 mm, for example. Thus, the miniaturization of the optical element 5 can be achieved, and at the same time the picture light beam L3 emitted from the exit surface 57 can be magnified to a relatively large size.

The length (the length in the Z-axis direction) of the optical element 5 is not particularly limited, but is preferably no smaller than 1 mm and no greater than 50 mm, and more particularly no smaller than 5 mm and no greater than 30 mm, for example. Thus, the miniaturization of the optical element 5 can be achieved, and at the same time the multiple reflection of the picture light beam L2 inside the optical element 5 can sufficiently be achieved, and the homogeneity of the intensity distribution of the picture light beam L3 emitted from the exit surface 57 can be further improved.

The width (the length in the Y-axis direction) of the optical element 5 is preferably no smaller than 0.1 mm and no larger than 100 mm, and more preferably no smaller than 0.3 mm and no larger than 50 mm, for example. Thus, the miniaturization of the optical element 5 can be achieved, and at the same time the picture light beam L3 emitted from the exit surface 57 can be magnified to a relatively large size.

As shown in FIGS. 8A through 8D, the optical element 5 having such a configuration has alight guide section (a first light guide section) 51, a light guide section (a second light guide section) 52, and a light guide section (a third light guide section) 53 each for guiding the picture light beam L2, and a half mirror layer (a first light branching layer) 54 and a half mirror layer (a second light branching layer) 55.

In the optical element 5, the light guide section 51, the half mirror layer 54, the light guide section 52, the half mirror layer 55, and the light guide section 53 are stacked in this order along the thickness direction (the X-axis direction) of each of the constituents. In other words, the optical element 5 is a one-dimensional array having the light guide sections 51, 52, and 53 arranged along the thickness direction (the first direction) of each of the sections via the half mirror layers 54, 55.

The light guide sections 51, 52, and 53 are each a light pipe having a plate-like shape, and each have a function of propagating the picture light beam L2 (the picture light beam moved by the light scanning section 35 to perform the scanning), which has entered through the plane of incidence 56, toward the +Z-axis direction.

It should be noted that although the light guide sections 51, 52, and 53 each have a rectangular cross-sectional shape (a cross-sectional shape in the X-Y plate) as shown in FIGS. 8A and 8B, the cross-sectional shape (the cross-sectional shape in the X-Y plane) of each of the light guide sections 51, 52, and 53 is not limited thereto, but can also be a quadrangular shape such as a square shape, other polygonal shapes, and so on.

Further, the thickness of each of the light guide sections 51, 52, and 53 is not particularly limited, but is configured to be smaller than the diameter (the diameter in the light beam width) of the picture light beam L2 entering the plane of incidence 56 in the present embodiment (see FIG. 9). In other words, the width of each of the light guide sections 51, 52, and 53 along the arrangement direction of the light guide sections 51, 52, and 53 on the plane of incidence 56 is smaller than the width of the picture light beam L2 along the arrangement direction of the light guide sections 51, 52, and 53 on the plane of incidence 56. Thus, it is possible to make the picture light beam L2 enter the plurality of light guide sections (the light guide sections 51, 52, and 53 in the present embodiment) in a straddling manner, and thus, the homogeneity of the intensity distribution of each of the picture light beams L3, L4 emitted from the exit surface 57 can be further improved. In order to obtain such an advantage, the thickness of each of the light guide sections 51, 52, and 53 is preferably no smaller than 0.01 mm and no larger than 10 mm, and more preferably no smaller than 0.01 mm and no larger than 5 mm, for example.

It should be noted that although the light guide sections 51, 52, and 53 are configured to have a thickness smaller than the diameter (the diameter in the light beam width) of the picture light beam L2 in the present embodiment, it is also possible for the thickness of the light guide sections 51, 52, and 53 to be set to be larger than the diameter of the picture light beam L2.

Further, the light guide sections 51, 52, and 53 have light permeability, and are formed of a variety of resin materials such as acrylic resin or polycarbonate resin, a variety of glass materials, and so on.

The half mirror layers 54, 55 are each formed of, for example, a reflecting film having light permeability, namely a semi-transmissive reflecting film. The half mirror layers 54, 55 each have a function of partially reflecting the picture light beam L2 and at the same time partially transmitting the picture light beam L2. The half mirror layers 54, 55 are each formed of a semi-transmissive reflecting film such as a metal reflecting film using, for example, silver (Ag) or aluminum (Al), or a dielectric multilayer film.

The optical element 5 having such a configuration can be obtained by, for example, bonding the light guide sections 51, 52, and 53 having thin films, which can form the half mirror layers 54, 55, formed on the principal surfaces to each other with surface activated bonding. By manufacturing the optical element 5 using the surface activated bonding, the parallelism of the sections (the light guide sections 51, 52, and 53) can be improved.

As shown in FIG. 9, the optical element 5 having such a configuration as described hereinabove makes the picture light beam L2, which has been moved by the light scanning section 35 to perform the scanning, enter the plane of incidence 56, multiply reflects the picture light beam L2 inside the optical element 5, and then emits the picture light beam L2 from the exit surface 57 as the picture light beams L3, L4 in the state in which the light beam width is enlarged. The fact that light beam width (the cross-sectional area) of the picture light beam L2 can be enlarged by the optical element 5 in such a manner will hereinafter be described in detail while explaining the light paths of the picture light beam L2 inside the optical element 5 based on FIGS. 9, 10A, and 10B. It should be noted that in FIGS. 10A and 10B, the principal ray of the picture light beam L2 is shown alone as a representative of the picture light beam L2.

Firstly, as shown in FIGS. 10A and 10B, the picture light beam L2, which has been moved by the light scanning section 35 to perform the scanning, enters the optical element 5 through the plane of incidence 56. On this occasion, the picture light beam L2 enters the optical element 5 in the state of being tilted at an angle θ5 with an axis light X parallel to both of the side surface 58a and the side surface 58b. As shown in FIGS. 10A and 10B, the picture light beam L2 having entered the optical element 5 proceeds inside the light guide section 52. When the picture light beam L2 reaches the half mirror layer 54, a part of the picture light beam L2 is transmitted through the half mirror layer 54, and the rest is reflected by the half mirror layer 54.

The picture light beam L21 having been transmitted through the half mirror layer 54 proceeds inside the light guide section 51, and is then totally reflected by the side surface 58a. Meanwhile, the picture light beam L22 having been reflected by the half mirror layer 54 proceeds inside the light guide section 52, and then reaches the half mirror layer 55. Here again, a part of the picture light beam L22 having reached the half mirror layer 55 is transmitted through the half mirror layer 55, and the rest is reflected by the half mirror layer 55 as shown in FIG. 10B. The picture light beam L22 having been transmitted through the half mirror layer 55 is then totally reflected by the side surface 58b as shown in FIG. 10B.

As described above, the picture light beam L2 guided to the inside of the optical element 5 repeats the total reflection on the side surfaces 58a, 58b, and at the same time, repeats the reflection and the transmission in the half mirror layers 54, 55. Specifically, the picture light beam L2 guided to the inside of the optical element 5 is multiply reflected in the inside of the optical element 5 as shown in FIG. 9.

Further, the picture light beam L2 is multiply reflected in the inside of the optical element 5, and as a result, the light components repeating the multiple reflection overlap each other, and thus, the picture light beams L3, L4 with the light beam width enlarged are emitted from the exit surface 57.

Here, as described above, the plane of incidence 56 and the exit surface 57 are parallel to each other. Therefore, the amount of the refraction of the picture light beam L2 entering the plane of incidence 56 and the amount of the refraction of the picture light beams L3, L4 emitted from the exit surface 57 can be made equal to each other. In other words, the angle θ5 at which the picture light beam L2 enters the optical element 5 with respect to the half mirror layers 54, 55 and the angle θ5 at which the picture light beams L3, L4 are emitted with respect to the half mirror layer 54, 55. Thus, the distortion due to the trigonometric function of the low of refraction and the chromatic aberration due to the wavelength dispersion of the refractive index of the material can be prevented from occurring.

It should be noted that although the plane of incidence 56 and the exit surface 57 are parallel to each other in the present embodiment, if the absolute values of the tilt angles of the plane of incidence 56 and the exit surface 57 are equal to each other, the incident angle of the picture light beam L2 and the exit angle of the picture light beam L3 can be made equal in absolute value to each other as described above. Therefore, if the absolute values of the tilt angles of the plane of incidence 56 and the exit surface 57 are equal to each other, the advantage described above can be obtained.

Further, the optical element 5 according to the present embodiment is a one-dimensional array (a first one-dimensional array) having the light guide sections 51, 52, and 53 arranged along the thickness direction (the first direction). As described above, it is possible to multiply reflect the picture light beam L2 having entered the optical element 5 through the plane of incidence 56 in the inside of the optical element 5 with the relatively simple configuration of stacking the light guide sections 51, 52, and 53, via the half mirror layers 54, 55. Therefore, the light beam width of the picture light beam L2 can be enlarged with such a relatively simple configuration as in the present embodiment without using the such a position detection device as to align the picture light beam with the line of sight of the observer or the positions of the right and left eyes EY of the observer.

Further, as shown in FIG. 3, in the state in which the head-mounted display 10 is mounted on the head H of the observer, the optical element 5 is disposed so that the principal rays of the picture light beams L3, L4 are emitted from the reflecting section 6 in the in-plane direction (the direction in the X-Z plane) including an axis line W (see FIGS. 1 and 3) parallel to the direction (the X-axis direction) in which the left eye EY and the right eye EY of the observer are arranged. In other words, the optical element 5 is disposed so that the cross-sectional area of the picture light beam L3 is enlarged in the direction of the axis line W. Further, the correction lens 42 and the light blocking plate 43 are arranged along the axis line W. Therefore, the picture light beam L3 emitted from the exit surface 57 is emitted toward the reflecting section 6 via the correction lens 42, and the picture light beam L4 emitted from the exit surface 57 is emitted toward the light blocking plate 43. By disposing the optical element 5 so that the cross-sectional area of the picture light beam L3 is enlarged in the direction of the axis line W as described above, it is possible to magnify the picture light beam L3, which is guided to the eyes of the observer via the correction lens 42 and the reflecting section 6, in the direction in which the right eye and the left eye are arranged. Therefore, it is possible to improve the visibility with respect to the horizontal direction larger in moving range than the vertical direction of the eyes.

Correction Lens

As shown in FIG. 3, the picture light beam L3 emitted from the optical element 5 enters the correction lens 42.

The correction lens 42 has a function of correcting the disturbance of the parallelism of the picture light beam L3 due to an aspherical mirror 61 provided to the reflecting section 6 described later. Thus, the resolution performance of the picture light beam L3 can be improved. As such a correction lens 42, there can be cited, for example, a toroidal lens, a cylindrical lens, and a free-form surface lens.

Light Blocking Plate

The picture light beam L4 emitted from the optical element 5 enters the light blocking plate 43.

The light blocking plate 43 is a light blocking device formed of a light absorbing member for absorbing the light for blocking the light. Thus, the picture light beam L4 emitted from the optical element 5 is blocked as unwanted light.

Such a light blocking plate 43 is formed of, for example, stainless steel or aluminum alloy.

It should be noted that although in the present embodiment, the light blocking plate 43 is used as the light blocking device for blocking the picture light beam L4, the light blocking device for blocking the picture light beam L4 is not limited to the light blocking plate 43, any device preventing the picture light beam L4 from becoming the stray light can be adopted. For example, as the light blocking device, it is also possible to adopt the configuration of coating the circumferential portion of the frame 2 with paint or the like to thereby block the picture light beam. L4 without using the light blocking plate 43.

As shown in FIG. 3, the picture light beam L3, which has the light beam width enlarged by the magnifying optical system 4 with the configuration described above, enters the reflecting section 6 via the correction lens 42.

Reflecting Section

The reflecting section 6 is provided to a shade section 212 of the front section 21, and is disposed so as to be located in front of the left eye EY of the observer when used. The reflecting section 6 has a size sufficient for covering the eye EY of the observer, and has a function of inputting the picture light beam L3 from the optical element 5 toward the eye EY of the observer.

The reflecting section 6 has the aspherical mirror 61 including a light deflection section 65.

The aspherical mirror 61 is a light transmissive member having a semi-transmissive reflecting film deposited on a base member formed of a resin material or the like exhibiting a high light transmissive property (light permeability) in the visible range. In other words, the aspherical mirror 61 is a half mirror, and also has a function (light transmissive property with respect to the visible light) of transmitting the external light. Therefore, the reflecting section 6 provided with the aspherical mirror 61 has a function of reflecting the picture light beam L3 having been emitted from the optical element 5, and at the same time transmitting the external light proceeding from the outside of the reflecting section 6 toward the eye EY of the observer when used. Thus, it is possible for the observer to visually recognize the virtual image (the image) formed by the picture light beam L5 while visually recognizing an external light image. In other words, a see-through head-mounted display can be realized.

Such an aspherical mirror 61 has a form curved along the curve of the front section 21 of the frame 2, and a concave surface 611 is located on the observer side when used. Thus, it is possible to efficiently collect the picture light beam L5, which has been reflected by the aspherical mirror 61, toward the eye EY of the observer.

Further, on the concave surface 611, there is disposed the light deflection section 65. The light deflection section 65 has a function of deflecting the picture light beam L3, which has been emitted from the exit surface 57 of the optical element 5, toward the direction of the eye EY of the observer.

Such a light deflection section 65 is formed of a hologram element 651 as one of the diffraction gratings in the present embodiment. The hologram element 651 is a semi-transmissive film having a characteristic of diffracting the light in a specific wavelength band out of the picture light beam L3, with which the optical element 5 irradiates the hologram element 651, and transmitting the light in the rest of the wavelength band.

By using such a hologram element 651, it is possible to form a virtual image by adjusting the angle and the light beam state of the picture light beam guided to the eye of the observer using diffraction with respect to the picture light beam in a specific wavelength band. Specifically, the picture light beam L3 having been reflected by the aspherical mirror 61 is emitted to the outside, and then enters the left eye EY of the observer as the picture light beam L5 using the hologram element 651. It should be noted that the same applies also to the reflecting section 6 located on the right eye EY side. Further, the picture light beams L5 having respectively entered the right and left eyes EY of the observer are imaged on the respective retinas of the observer. Thus, it is possible for the observer to observe the virtual image (the image) formed by the picture light beam L3 emitted from the optical element 5 in the visual field area.

According to such a virtual image display device 1 as explained hereinabove, by magnifying the picture light beam L1 generated by the image generation section 3 with the magnifying optical system 4, and then guiding the picture light beam L1 to the eye EY of the observer using the reflecting section 6, it is possible for the observer to visually recognize the picture light beam L1 generated by the image generation section 3 as the virtual image formed in the visual field area of the observer.

Second Embodiment

Next, a virtual image display device according to a second embodiment of the invention will be explained.

Figures 11A, 11B, 11C, 11D:
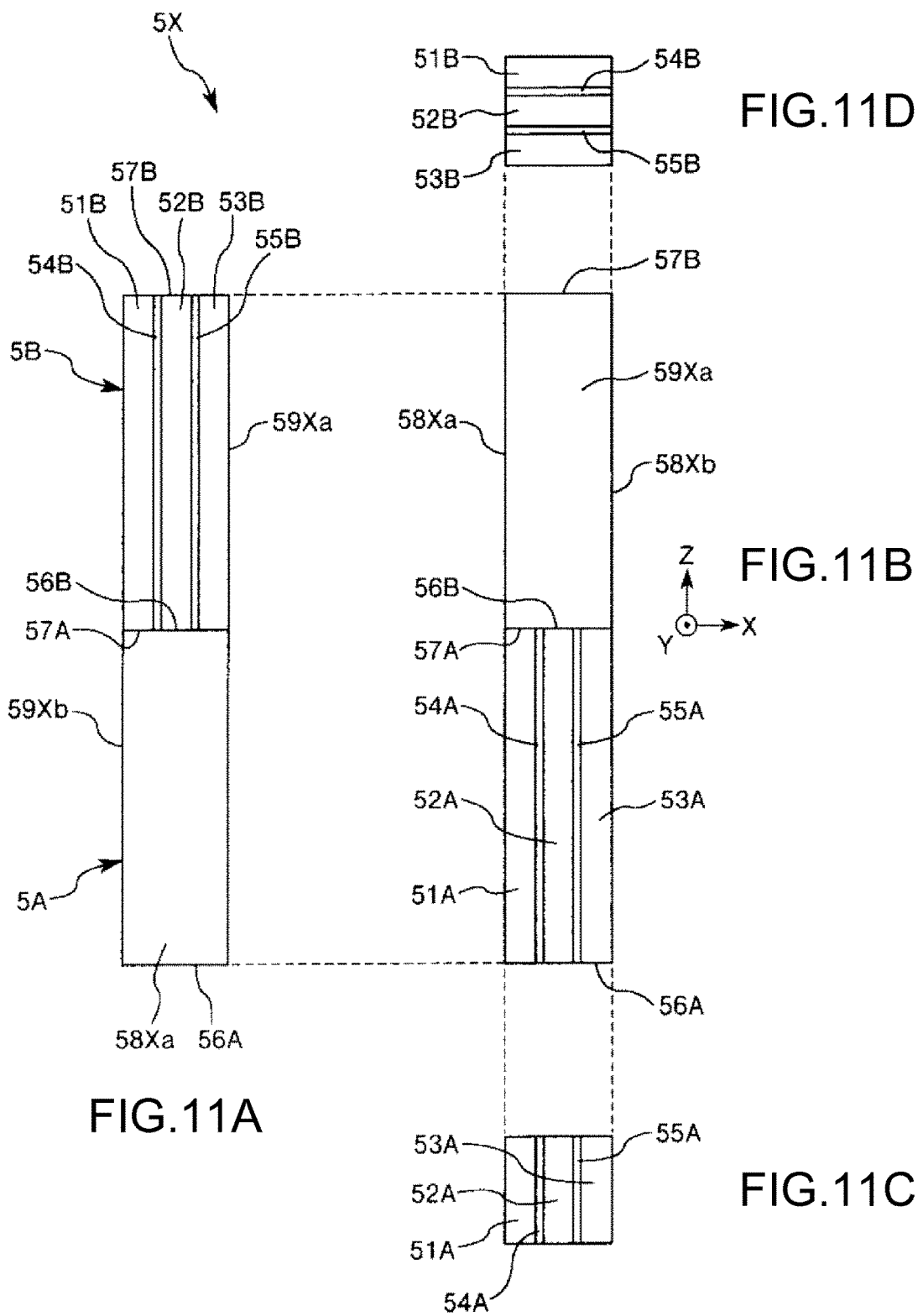
Figure 12:
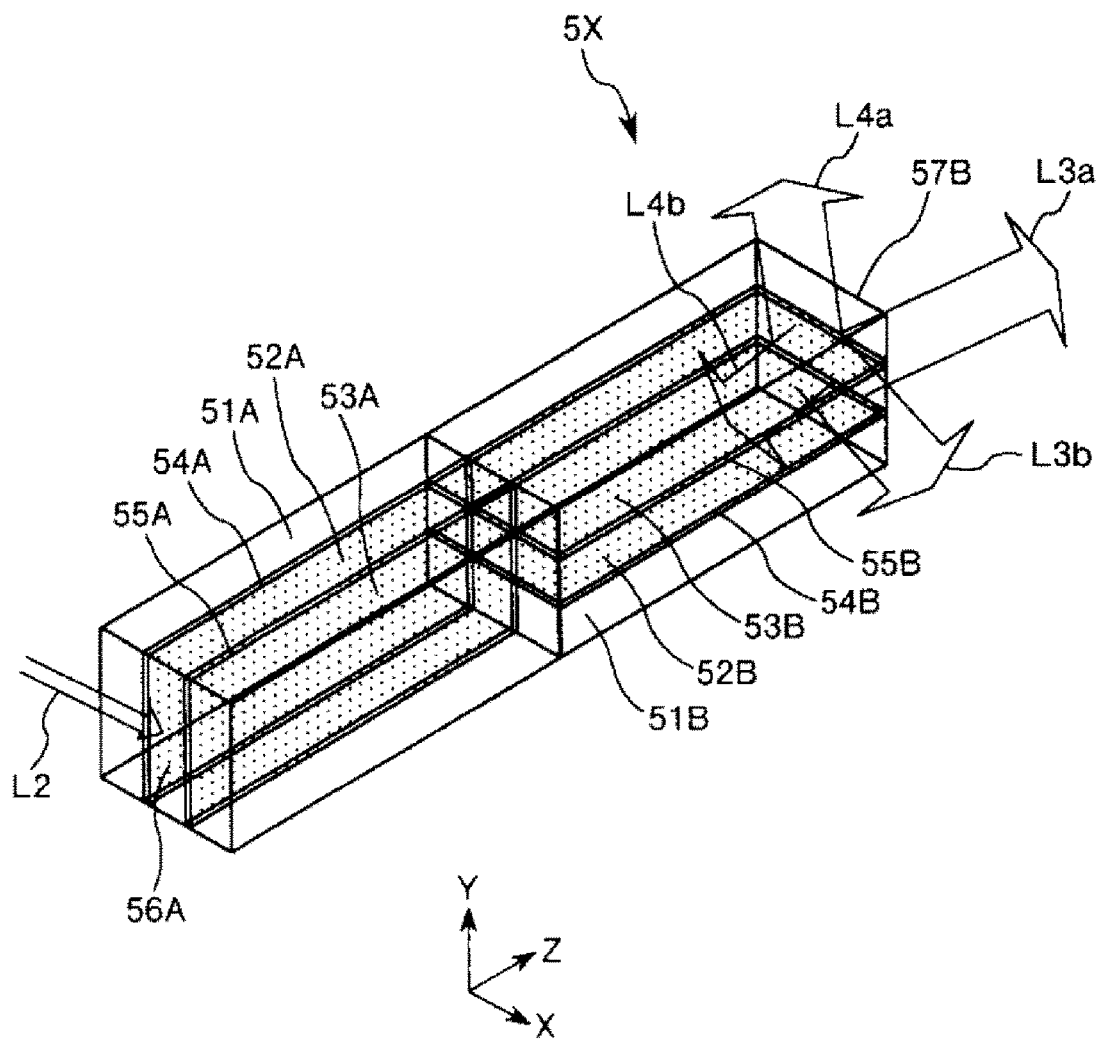
FIG. 12 is a diagram for explaining paths of the picture light beam having entered the optical element shown in FIGS. 11A through 11D.

FIGS. 11A through 11D are diagrams showing a schematic configuration of an optical element provided to the virtual image display device according to the second embodiment, wherein FIG. 11A is a front view, FIG. 11B is a plan view, FIG. 11C is a right side view, and FIG. 11D is a left side view. FIG. 12 is a diagram for explaining paths of the picture light beam having entered an optical element shown in FIGS. 11A through 11D.

Hereinafter, the virtual image display device according to the second embodiment of the invention will be described with reference to these drawings with a focus mainly on the differences from the embodiment described above, and the explanation regarding similar matters will be omitted.

The second embodiment is substantially the same as the embodiment described above except the point that the configuration of the magnifying optical section is different.

As shown in FIGS. 11A through 11D, an optical element 5X has a first optical element (optical element) 5A and a second optical element (optical element) 5B, and is obtained by integrating the two optical elements 5A, 5B. Specifically, the optical elements 5A, 5B each have a configuration similar to that of the optical element 5 used in the first embodiment, and the optical element 5B is disposed in the state of rotating the optical element 5A as much as 90° around the Z axis.

Hereinafter, the optical element 5A will be explained in detail.

In the optical element 5X, the exit surface 57A of the optical element 5A and the plane of incidence 56B of the optical element 5B are bonded to each other to thereby integrate these (the optical elements 5A, 5B) with each other. Further, the plane of incidence 56A of the optical element 5A corresponds to the plane of incidence of the optical element 5X, and the exit surface 57B of the optical element 5B corresponds to the exit surface of the optical element 5X.

Further, similar to the first embodiment, the optical element 5X has side surfaces 58Xa, 58Xb opposed to each other in the thickness direction (the X-axis direction) of the optical element 5X, and side surfaces 59Xa, 59Xb opposed to each other in the width direction (the Y-axis direction) of the optical element 5X. The side surfaces 58Xa, 58Xb, 59Xa, and 59Xb are all total reflection surfaces, and totally reflect the picture light beam L2 having entered the inside of the optical element 5X.

Further, the optical element 5A is a first one-dimensional array having light guide sections 51A, 52A, and 53A arranged along the thickness direction (the first direction) of each of the sections via half mirror layers 54A, 55A. Further, the optical element 5B is a second one-dimensional array having light guide sections 51B, 52B, and 53B arranged along the thickness direction (the second direction) of each of the sections via half mirror layers 54B, 55B. As described above, the optical element 5X has the two one-dimensional arrays.

Further, the direction in which the light guide sections 51A, 52A, and 53A of the optical element 5A are arranged, namely the stacking direction (the X-axis direction), and the direction in which the light guide sections 51B, 52B, and 53B of the optical element 5B are arranged, namely the stacking direction (the Y-axis direction), are here different from each other, and are perpendicular to each other.

The optical element 5X having the configuration described hereinabove multiply reflects the picture light beam L2, which has been input from the plane of incidence 56A, in the inside of the optical element 5X, and then emits the picture light beams L3a, L3b, L4a, and L4b in the state in which the light beam width is enlarged from the exit surface 57B (see FIG. 12).

Specifically, similarly to the first embodiment, the picture light beam. L2, which has been input from the plane of incidence 56A and then guided to the inside of the optical element 5A, is propagated in the Z-axis direction while repeating total reflection on the side surfaces 58Xa, 58Xb on the optical element 5A side, and at the same time repeating reflection and transmission in the half mirror layers 54A, 55A. The picture light beam L2 propagated inside the optical element 5A in the Z-axis direction is emitted from the exit surface 57A of the optical element 5A and is guided from the plane of incidence 56B to the inside of the optical element 5B. The picture light beam L2 guided to the inside of the optical element 5B is propagated in the Z-axis direction while repeating total reflection on the side surfaces 58Xa, 58Xb, 59Xa, and 59Xb on the optical element 5B side, and repeating reflection and transmission in the half mirror layers 54B, 55B. In such a manner as described above, the picture light beam L2 is multiply reflected in the inside of the optical element 5X, and the picture light beams L3a, L3b, L4a, and L4b are emitted from the exit surface 57B. Further, the picture light beam L3a is transmitted to the reflecting section 6 via the correction lens 42, and the picture light beams L3b, L4a, and L4b are blocked by the light blocking plate (not shown) as unwanted light. It should be noted that although in the present embodiment, only the picture light beam L3a is transmitted to the reflecting section 6, it is also possible for two or more picture light beams out of the picture light beams L3a, L3b, L4a, and L4b to be transmitted to the reflecting section 6.

Here, as described above, the direction (the stacking direction) in which the light guide sections 51A, 52A, and 53A of the optical element 5A are arranged, and the direction in which the light guide sections 51B, 52B, and 53B of the optical element 5B are arranged are perpendicular to each other. Further, the optical element 5X is disposed so that the picture light beam L2, which has been emitted from the exit surface 57A of one optical element (the first one-dimensional array) 5A, enters the plane of incidence 56B of the other optical element 5B (the second one-dimensional array), and the exit surface 57A and the plane of incidence 56B are connected to each other. Therefore, the picture light beam L2 having been input from the plane of incidence 56A can be enlarged in the cross-sectional area along two directions, in which the light guide sections are arranged. Further, the multiple reflection can be achieved using the plurality of light guide sections (the light guide sections 51A, 52A, 53A, 51B, 52B, and 53B in the present embodiment), and thus, the homogeneity of the intensity distribution of the picture light beams L3a, L3b, L4a, and L4b having been emitted from the exit surface 57B can be further improved.

It should be noted that although in the present embodiment, the direction (stacking direction) in which the light guide sections 51A, 52A, and 53A are arranged and the direction (the stacking direction) in which the light guide sections 51B, 52B, and 53B of the optical element 5B are perpendicular to each other, the invention is not limited this configuration, and the advantage described above can be obtained providing the direction in which the light guide sections 51A, 52A, and 53A are arranged and the direction in which the light guide sections 51B, 52B, and 53B are arranged are different from each other.

According also to the optical element 5X of the second embodiment having the configuration described above, the light beam width of the picture light beam L2 can be enlarged with a relatively simple configuration similarly to the first embodiment.

Third Embodiment

Next, a virtual image display device according to a third embodiment of the invention will be explained.

Figure 14:
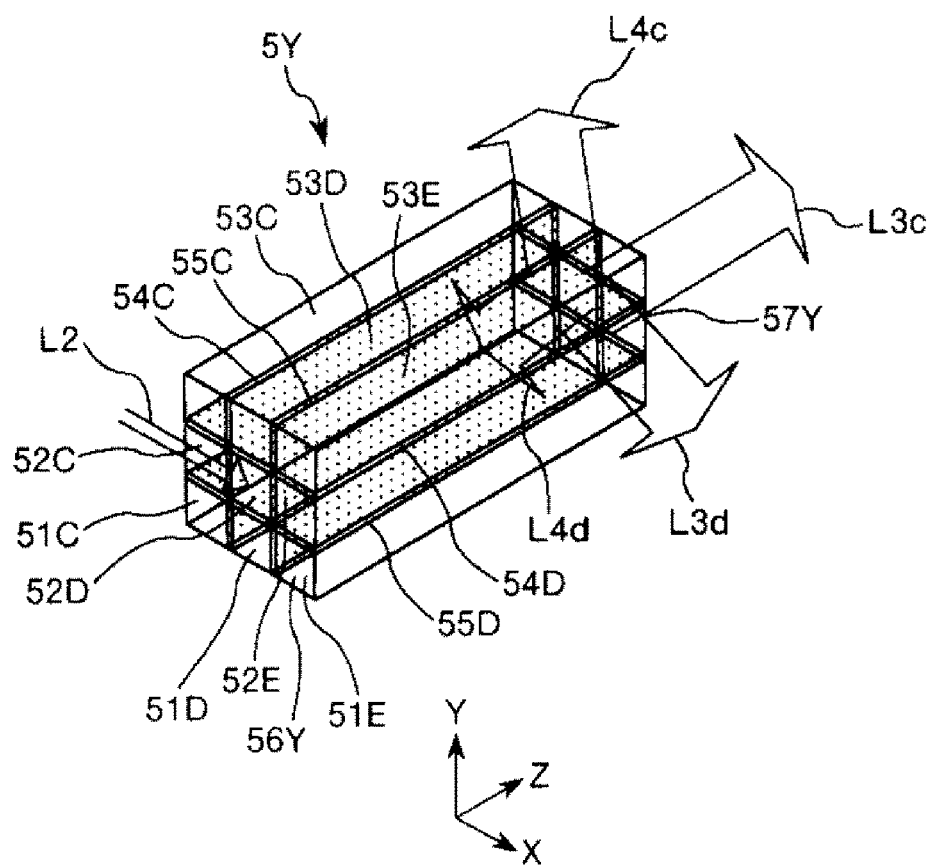
FIG. 14 is a diagram for explaining paths of the picture light beam having entered the optical element shown in FIGS. 13A through 13D.

FIGS. 13A through 13D are diagrams showing a schematic configuration of an optical element provided to the virtual image display device according to the third embodiment, wherein FIG. 13A is a front view, FIG. 13B is a plan view, FIG. 13C is a right side view, and FIG. 13D is a left side view. FIG. 14 is a diagram for explaining paths of the picture light beam having entered the optical element shown in FIGS. 13A through 13D.

Hereinafter, the virtual image display device according to the third embodiment of the invention will be described with reference to these drawings with a focus mainly on the differences from the embodiment described above, and the explanation regarding similar matters will be omitted.

The third embodiment is substantially the same as the embodiment described above except the point that the configuration of the optical element is different.

The optical element 5Y provided to the virtual image display device according to the third embodiment will be described in detail.

Similarly to the first embodiment, the optical element 5Y has a plane of incidence 56Y and a exit surface 57Y opposed in the length direction (the Z-axis direction) to each other, side surfaces 58Ya, 58Yb opposed in the thickness direction (the X-axis direction) to each other, and side surfaces 59Ya, 59Yb opposed in the width direction (the Y-axis direction) to each other.

Further, the side surfaces 58Ya, 58Yb, 59Ya, and 59Yb are all total reflection surfaces, and totally reflect the picture light beam L2 having entered the inside of the optical element 5Y.

Such an optical element 5Y has a first light guide section (a light guide section) 51C, a second light guide section (a light guide section) 52C, a third light guide section (a light guide section) 51D, a fourth light guide section (a light guide section) 53C, a fifth light guide section (a light guide section) 52D, a sixth light guide section (a light guide section) 53D, a seventh light guide section (a light guide section) 51E, an eighth light guide section (a light guide section) 52E, a ninth light guide section (a light guide section) 53E, a half mirror layer (a first light branching layer) 54C, a half mirror layer (a second light branching layer) 55C, a half mirror layer (a third light branching layer) 54D, and a half mirror layer (a fourth light branching layer) 55D.

The nine light guide sections 51C, 52C, 53C, 51D, 52D, 53D, 51E, 52E, and 53E are arranged in a 3×3 matrix in the X-axis direction and the Y-axis direction perpendicular to each other. Specifically, the optical element 5Y has, for example, the first light guide section 51C, the second light guide section 52C, and the fourth light guide section 53C arranged along the first direction (the Y-axis direction), and the first light guide section 51C, the third light guide section 51D, and the seventh light guide section 51E arranged along the second direction (the X-axis direction) different from the first direction (the Y-axis direction). Further, the second light guide section 52C, the fifth light guide section 52D, and the eighth light guide section 52E are arranged along the second direction (the X-axis direction) different from the first direction (the Y-axis direction). Further, the fourth light guide section 53C, the sixth light guide section 53D, and the ninth light guide section 53E are arranged along the second direction (the X-axis direction) different from the first direction (the Y-axis direction). As described above, the nine light guide sections 51C, 52C, 53C, 51D, 52D, 53D, 51E, 52E, and 53E are arranged two-dimensionally.

Further, the half mirror layers 54C, 55C, 54D, and 55D are disposed between the light guide sections 51C, 52C, 53C, 51D, 52D, 53D, 51E, 52E, and 53E.

The optical element 5Y having such a configuration multiply reflects the picture light beam L2, which has been input from the plane of incidence 56Y, in the inside of the optical element 5Y, and then emits the picture light beams L3c, L3d, L4c, and L4d in the state in which the light beam width is enlarged from the exit surface 57Y as shown in FIG. 14.

Specifically, the picture light beam L2 moved by the light scanning section 35 to perform scanning is input from the plane of incidence 56Y, guided to the inside of the optical element 5Y, and is propagated in the Z-axis direction while repeating total reflection on the side surfaces 58Ya, 58Yb, 59Ya, and 59Yb, and repeating reflection and transmission in the half mirror layers 54C, 55C, 54D, and 55D. In such a manner as described above, the picture light beam L2 is multiply reflected in the inside of the optical element 5Y, and the picture light beams L3c, L3d, L4c, and L4d are emitted from the exit surface 57Y. Further, the picture light beam L3c is transmitted to the reflecting section 6 via the correction lens 42, and the picture light beams L3d, L4c, and L4d are blocked by the light blocking plate (not shown) as unwanted light. It should be noted that although in the present embodiment, only the picture light beam L3c is transmitted to the reflecting section 6, it is also possible for two or more picture light beams out of the picture light beams L3c, L3d, L4c, and L4d to be transmitted to the reflecting section 6.

Here, as described above, in the optical element 5Y, the nine light guide sections 51C, 52C, 53C, 51D, 52D, 53D, 51E, 52E, and 53E are arranged two-dimensionally. Therefore, the picture light beam L2 having been input from the plane of incidence 56Y can be enlarged in the cross-sectional area along two directions, in which the light guide sections are arranged. Further, the multiple reflection can be achieved using the plurality of light guide sections (the light guide sections 51C, 52C, 53C, 51D, 52D, 53D, 51E, 52E, and 53E in the present embodiment), and thus, the homogeneity of the intensity distribution of the picture light beams L3c, L3d, L4c, and L4d having been emitted from the exit surface 57Y can be further improved.

It should be noted that although in the present embodiment, the light guide sections 51C, 52C, 53C, 51D, 52D, 53D, 51E, 52E, and 53E are arranged in the 3×3 matrix, the number, the arrangement, the shapes, and so on thereof are not limited thereto, but the advantage described above can be obtained as long as the light guide sections are arranged two-dimensionally.

According also to the optical element 5Y of the third embodiment having the configuration described above, the light beam width of the picture light beam L2 can be enlarged with a relatively simple configuration similarly to the first embodiment.

Fourth Embodiment

Next, a virtual image display device according to a fourth embodiment of the invention will be explained.

Figure 15A:
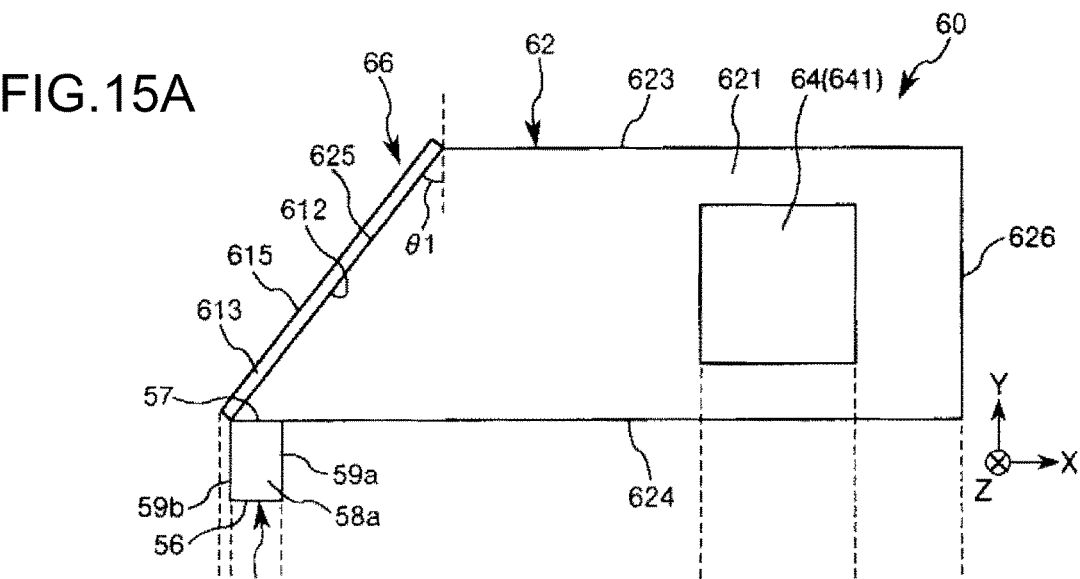
Figure 15B:
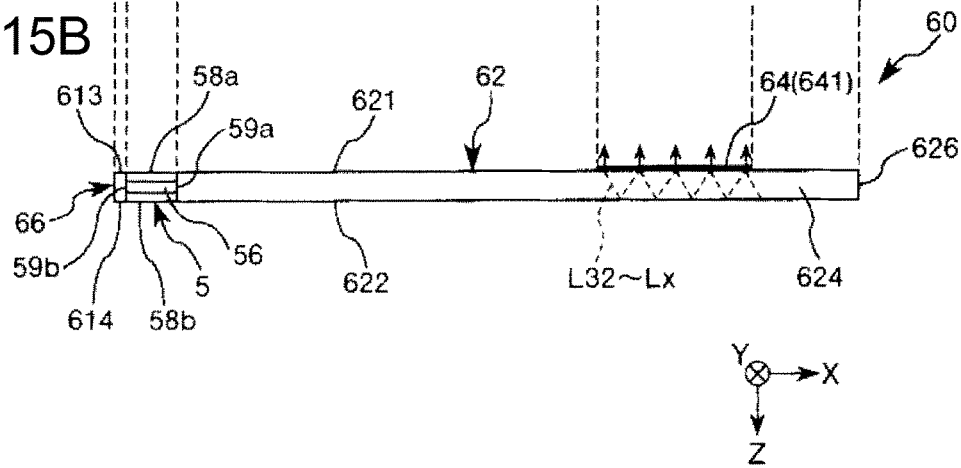
Figure 16A:
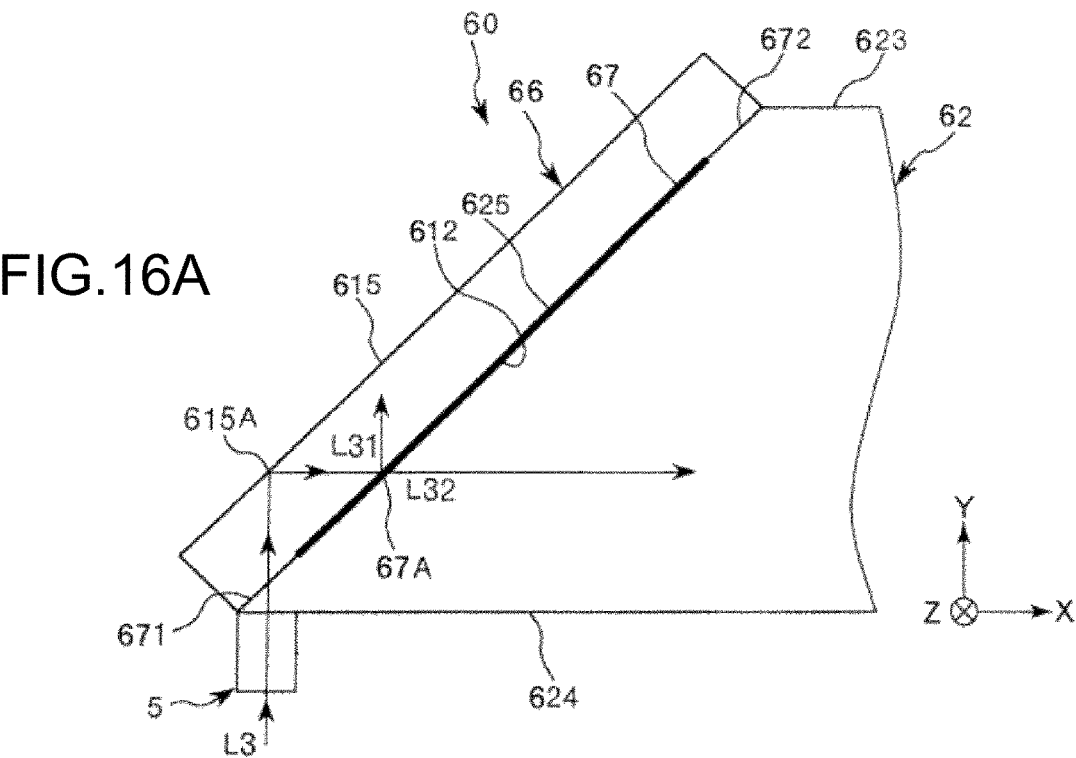
FIGS. 16A and 16B are diagrams for explaining paths of the picture light beam having entered the optical element shown in FIGS. 15A and 15B.
Figure 16B:
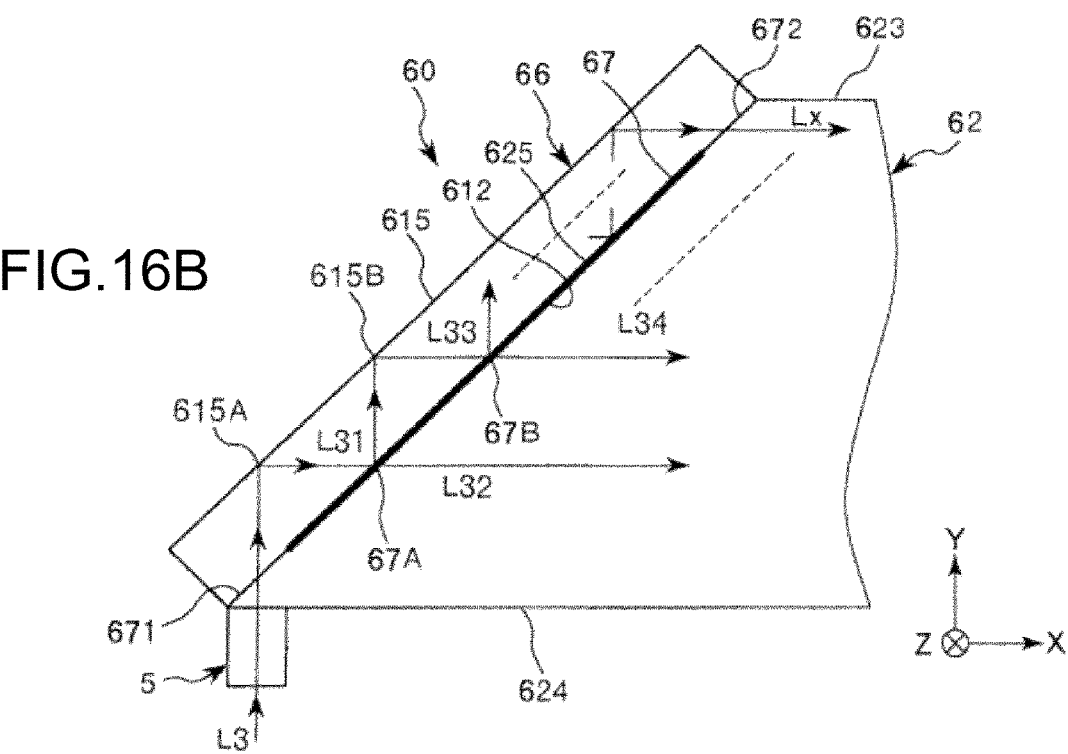

FIGS. 15A and 15B are diagrams showing an optical element provided to a virtual image display device according to the fourth embodiment of the invention, wherein FIG. 15A is a plan view, and FIG. 15B is a side view. FIGS. 16A and 16B are diagrams for explaining paths of the picture light beam having entered the optical element shown in FIGS. 15A and 15B.

Hereinafter, the virtual image display device according to the fourth embodiment of the invention will be described with reference to these drawings with a focus mainly on the differences from the embodiment described above, and the explanation regarding similar matters will be omitted.

The fourth embodiment is the same as the first embodiment except the fact that the correction lens 42, the light blocking plate 43, and the reflecting section 6 are not provided, and a magnifying light guide section 60 is provided instead.

As shown in FIGS. 15A and 15B, the magnifying light guide section 60 is provided with a first light guide plate (a first magnifying light guide section) 66 and a second light guide plate (a second magnifying light guide section) 62 provided with a light takeoff section 64. Further, the magnifying light guide section 60 is connected to the optical element 5.

The magnifying light guide section 60 has a function of inputting the picture light beam L3 from the optical element 5 toward the eye EY of the observer, and at the same time has a function of two-dimensionally magnifying the picture light beam L3 emitted from the optical element 5. In other words, the magnifying light guide section 60 has a function of further enlarging the light beam width of the picture light beam L3 having been emitted from the optical element 5.

Hereinafter, the magnifying light guide section 60 will be explained in detail.

As shown in FIG. 15A, the first light guide plate 66 has an elongated shape, and has a pair of side surfaces 613, 614 opposed to each other in the width direction of the first light guide plate 66 (the thickness direction of the magnifying light guide section 60; the Z-axis direction), and a first principal surface (a first reflecting surface) 615 and the second principal surface 612 opposed to each other in the thickness direction of the first light guide plate 66 (the direction perpendicular to the width direction and the longitudinal direction of the first light guide plate 66). The first principal surface 615 and the second principal surface 612 are parallel to each other, and the side surface 613 and the side surface 614 are parallel to each other. It should be noted that in the present specification, the term "parallel" denotes the state in which the angle formed between the surfaces is equal to or smaller than ±2°, preferably equal to or smaller than 0.2°.

To the second principal surface 612 of the first light guide plate 66, there is fixed a second light guide plate 62.

The second light guide plate 62 has an elongated shape longer in the X-axis direction, and has a pair of first principal surface 621 and second principal surface 622 opposed to each other in the thickness direction of the second light guide plate 62, a pair of side surfaces 623, 624 opposed to each other in the width direction of the second light guide plate 62 (the Y-axis direction), and a pair of side surfaces 625, 626 opposed to each other in the longitudinal direction of the second light guide plate 62 (the X-axis direction). Further, the first principal surface 621 and the second principal surface 622 are parallel to each other, and the side surface 623 and the side surface 624 are parallel to each other. Further, the side surface 625 is disposed obliquely to the width direction (an incident direction) of the second light guide plate 62, and has a planar view shape, which is the same as the planner view shape of the second principal surface 612 of the first light guide plate 66. Meanwhile, the side surface 626 is disposed perpendicularly to the longitudinal direction of the second light guide plate 62.

It should be noted that the tilt angle θ1 of the side surface 625 is preferably no smaller than 20° and no greater than 70°, more preferably no smaller than 40° and no greater than 50°, and is particularly preferably equal to 45°. Thus, it is possible to guide the picture light beam L3 having been input from the optical element 5 along the longitudinal direction of the second light guide plate 62 when inputting the picture light beam L3 along the direction perpendicular to the longitudinal direction of the second light guide plate 62. Therefore, it becomes easy to adjust the incident angle.

Further, on the first principal surface 621 of the second light guide plate 62, there is disposed the light takeoff section 64 for taking off the light, which is guided by the second light guide plate 62, outside the second light guide 62 (frontward of the sheet of FIG. 15A). The light takeoff section 64 is formed of the hologram element 641. The hologram element 641 has a width in the longitudinal direction of the second light guide plate 62 (the X-axis direction) and a height in the width direction of the second light guide plate 62 (the Y-axis direction). The hologram element 641 is a partially reflective transmission film having a characteristic of diffracting light in a specific wavelength band and transmitting light in the rest of the wavelength band similarly to the first embodiment. The hologram element 641 adjusts the incident angle and the light beam state of the picture light beam in the specific wavelength band to become the desired ones using diffraction to thereby form the virtual image, and transmits most part of the component of the external light in the broad wavelength band. By using the hologram element 641 as the light takeoff section 64, it is possible to provide the virtual image display device 1 capable of easily change the proceeding direction of the light, and superior in light efficiency.

In the first light guide plate 66 and the second light guide plate 62, the second principal surface 612 of the first light guide plate 66 and an end surface 625 of the second light guide plate 62 are fixed to each other, and the width direction of the first light guide plate 66 and the thickness direction of the second light guide plate 62 coincide with each other.

The optical element 5 is disposed on the second principal surface 612 side of the second light guide plate 62 provided to the magnifying light guide section 60 having such a configuration and the vicinity of the boundary portion between the side surface 624 and the end surface 625 (on the front side in the proceeding direction of the picture light beam L3 of the highly permeable surface 671 described later). The optical element 5 is disposed with respect to the magnifying light guide section 60 so that the picture light beams L3, L4 having been emitted from the optical element 5 enter the first light guide plate 66 via the highly permeable surface 671 described later. Further, the optical element 5 is disposed so that the side surface 58a and the side surface 58b are arranged along the Z-axis direction shown in FIGS. 15A and 15B, and the side surface 59a and the side surface 59b are arranged along the X-axis direction.

In such a magnifying light guide section 60, the first principal surface 615 and the side surfaces 613, 614 of the first light guide plate 66, and the first principal surface 621, the second principal surface 622, and the side surfaces 623, 624 of the second light guide plate 62 each form a total reflection surface for totally reflecting the light having been input.

Further, as shown in FIGS. 16A and 16B, a partially permeable reflecting surface (a second reflecting surface) 67 is formed between the first light guide plate 66 and the second light guide plate 62. The partially permeable reflecting surface 67 is formed on the second principal surface 612 of the first light guide plate 66 in the present embodiment. The partially permeable reflecting surface 67 is formed in a portion (a surface indicated by the heavy line in FIG. 16A) of the second principal surface 612 of the first light guide plate 66 except both ends thereof. Further, the partially permeable reflecting surface 67 reflects a part of the light beam having entered the magnifying light guide section 60, and transmits apart of the light beam having entered the magnifying light guide section 60. It should be noted that the partially permeable reflecting surface 67 can also be formed on the end surface 625 of the second light guide plate 62.

The method of forming the partially permeable reflecting surface 67 is not particularly limited, but there can be cited, for example, a method of evaporating a metal film made of, for example, Cr or Ag, a dielectric film, a hybrid film obtained by combining these films, and so on.

Further, in the partially permeable reflecting surface 67, the light transmission of the lower end portion shown in FIGS. 16A and 16B is no lower than 5% and no higher than 10%, and the light transmission of the upper end portion shown in FIGS. 16A and 16B is no lower than 12% and no higher than 17%. Further, in the partially permeable reflecting surface 67, there is adopted the configuration in which the light transmission gradually rises as the distance from the highly permeable surface (a light entrance section) 671 described later increases in the part between both end portions. As a method of obtaining such a configuration, there can be cited, for example, a method of adjusting the thickness of the metal film, the dielectric film, or the hybrid film all described above.

Further, on both end sides (the area of the second principal surface 612 of the first light guide plate 66 where the partially permeable reflecting surface 67 is not formed) of the partially permeable reflecting surface 67, there are formed highly permeable surfaces 671, 672 higher in light transmission than the partially permeable reflecting surface 67. The highly permeable surface 671 is located on the side surface 624 side of the partially permeable reflecting surface 67, and the highly permeable surface 672 is located on the side surface 623 side of the partially permeable reflecting surface 67. The light transmission of the highly permeable surfaces 671, 672 is preferably equal to or higher than 95%.

Here, the principle that the picture light beams L3, L4 emitted from the optical element 5 are two-dimensionally magnified by the magnifying light guide section 60 will be explained. It should be noted that the principle that the picture light beam L3 is two-dimensionally magnified by the magnifying light guide section 60 as a representative of the picture light beams L3, L4 will hereinafter be described in detail. Further, since an attenuation amount in the reflection on the total reflection surface is sufficiently small compared to the amount of the light entering the total reflection surface, the attenuation amount will hereinafter be ignored. Further, when the picture light beam L3 is guided in the first light guide plate 66, the picture light beam L3 is guided by the first light guide plate 66 while repeating total reflection between the first principal surface 615, the second principal surface 612, the side surfaces 613, 614. However, for the sake of convenience of explanation, it is assumed that the picture light beam L3 is guided by the first light guide plate 66 while repeating reflection between the first principal surface 615 and the second principal surface 612. Similarly, when light beam is guided in the second light guide plate 62, the picture light beam L3 is guided by the second light guide plate 62 while repeating total reflection between the first principal surface 621, the second principal surface 622, the side surfaces 623, 624. However, for the sake of convenience of explanation, it is assumed that the picture light beam L3 is guided by the second light guide plate 62 while repeating reflection between the first principal surface 621 and the second principal surface 622.

Firstly, the picture light beam L3 emitted from the optical element 5 enters the first light guide plate 66 via the side surface 624 of the second light guide plate 62 and the highly permeable surface 671. As described above, since the highly permeable surface 671 has the light transmission higher than 95%, most part of the light can enter the inside of the first light guide plate 66.

As shown FIG. 16A, the picture light beam L3 having been transmitted through the highly permeable surface 671 is reflected by a part 615A of the first principal surface 615, and then proceeds toward the partially permeable reflecting surface 67. The picture light beam L3 having reached the part 67A of the partially permeable reflecting surface 67 is partially reflected, and then proceeds toward the first principal surface 615 again as a light beam. L31. Then, a part (the remaining) of the picture light beam L3 having reached the part 67A of the partially permeable reflecting surface 67 enters the second light guide plate 62 as a light beam L32.

As shown in FIG. 16B, the light beam L31 proceeding toward the first principal surface 615 is reflected by a part 615B of the first principal surface 615 located on the downstream side of the part 615A in the proceeding direction of the light beam, and then proceeds again toward the partially permeable reflecting surface 67. Then, the light beam L31 having reached a part 67B of the partially permeable reflecting surface 67 located on the downstream side of the part 67A in the proceeding direction of the light beam is partially reflected similarly to the above, and then proceeds again toward the first principal surface 615 as a light beam L33. The remaining of the light beam L31 having reached the part 67B of the partially permeable reflecting surface 67 enters the second light guide plate 62 as a light beam L34.

While repeating total reflection and partial reflection in such a manner, the picture light beam L3 is guided inside the first light guide plate 66, and at the same time also enters the inside of the second light guide plate 62. Further, the light beams (the light beam L32 through the light beam Lx) having entered the second light guide plate 62 is guided from the left side of FIGS. 16A and 16B to the right side of FIGS. 16A and 16B while repeating total reflection between the first principal surface 621 and the second principal surface 622 of the second light guide plate 62. Then, the light beam L32 through the light beam Lx are partially taken off to the outside of the second light guide plate 62 using the hologram element 641, and thus, the observer can visually recognize the light beams as the virtual image. On this occasion, as shown in FIG. 15B, the light beam. L32 through the light beam Lx are multiply reflected between the hologram element 641 and the second principal surface 622. The light beam L32 through the light beam Lx are partially transmitted through the hologram element 641, and emitted to the outside of the second light guide plate 62 along the thickness direction of the second light guide plate 62.

In such a manner as described above, the light beam L32 through the light beam Lx are magnified in the width direction of the hologram element 641 (the longitudinal direction of the second light guide plate 62; the X-axis direction).

Here, the picture light beam entering the second light guide plate 62 attenuates as the distance from the highly permeable surface 671 increases in the case in which the light transmission of the partially permeable reflecting surface 67 is constant throughout the entire length in the longitudinal direction of the partially permeable reflecting surface 67. In other words, in the case in which the light transmission of the partially permeable reflecting surface 67 is constant throughout the entire length in the longitudinal direction of the partially permeable reflecting surface 67, among the light beams entering the second light guide plate 62, the light intensities of the light beam L32 through the light beam Lx becomes lower in this order due to the attenuation. However, as described above, the partially permeable reflecting surface 67 is configured so that the light transmission gradually rises as the distance from the highly permeable surface 671 increases. Therefore, the picture light beam L34, for example, is transmitted through a part of the partially permeable reflecting surface 67 higher in light transmission than the part thereof through which the light beam L32 is transmitted. As a result, the difference in light intensity between the light beam L32 and the light beam L34 can be minimized. Therefore, the light intensities of the light beams (the light beam L32 through the light beam Lx) having entered the second light guide plate 62 can be made as even as possible. Therefore, the variation in virtual image displayed by the hologram element 641 can be reduced.

Further, the picture light beam Lx is the light beam having a large attenuation amount among the picture light beam L32 through the light beam Lx. However, as shown in FIG. 16B, since the picture light beam Lx is transmitted through the highly permeable surface 672, the light intensities of the picture light beams (the picture light beam L32 through the picture light beam Lx) having entered the second light guide plate 62 can more effectively be made roughly homogeneous.

It should be noted that the constituent material of the first light guide plate 66 and the second light guide plate 62 is not particularly limited providing the material has light permeability, and for example, a variety of types of resin such as acrylic resin or epoxy resin, or a variety of types of glass can be used.

As described above, the magnifying light guide section 60 magnifies the picture light beam L3 in the vertical direction in FIGS. 16A and 16B using the first light guide plate 66, and magnifies the picture light beam L3 in the horizontal direction in FIGS. 16A and 16B using the second light guide plate 62 (the hologram element 641). In other words, the magnifying light guide section 60 is capable of two-dimensionally magnifying the picture light beam L3. Further, in the magnifying light guide section 60, it is possible to two-dimensionally magnify the picture light beam L3 with an extremely simple configuration of disposing the first principal surface 615 of the first light guide plate 66 and the partially permeable reflecting surface 67 so as to be opposed in parallel to each other.

Further, since it is sufficient to adjust the two surfaces (the first principal surface 615 and the second principal surface 612 of the first light guide plate 66) so as to be parallel to each other when manufacturing the magnifying light guide section 60, it is possible to extremely easily manufacture the magnifying light guide section 60. Further, in the present embodiment, the magnifying light guide section 60 can be manufactured using a simple method of fixing the first light guide plate 66 constant in thickness to the end surface 625 of the second light guide plate 62.

Fifth Embodiment

Next, a virtual image display device according to a fifth embodiment of the invention will be explained.

Figure 17:
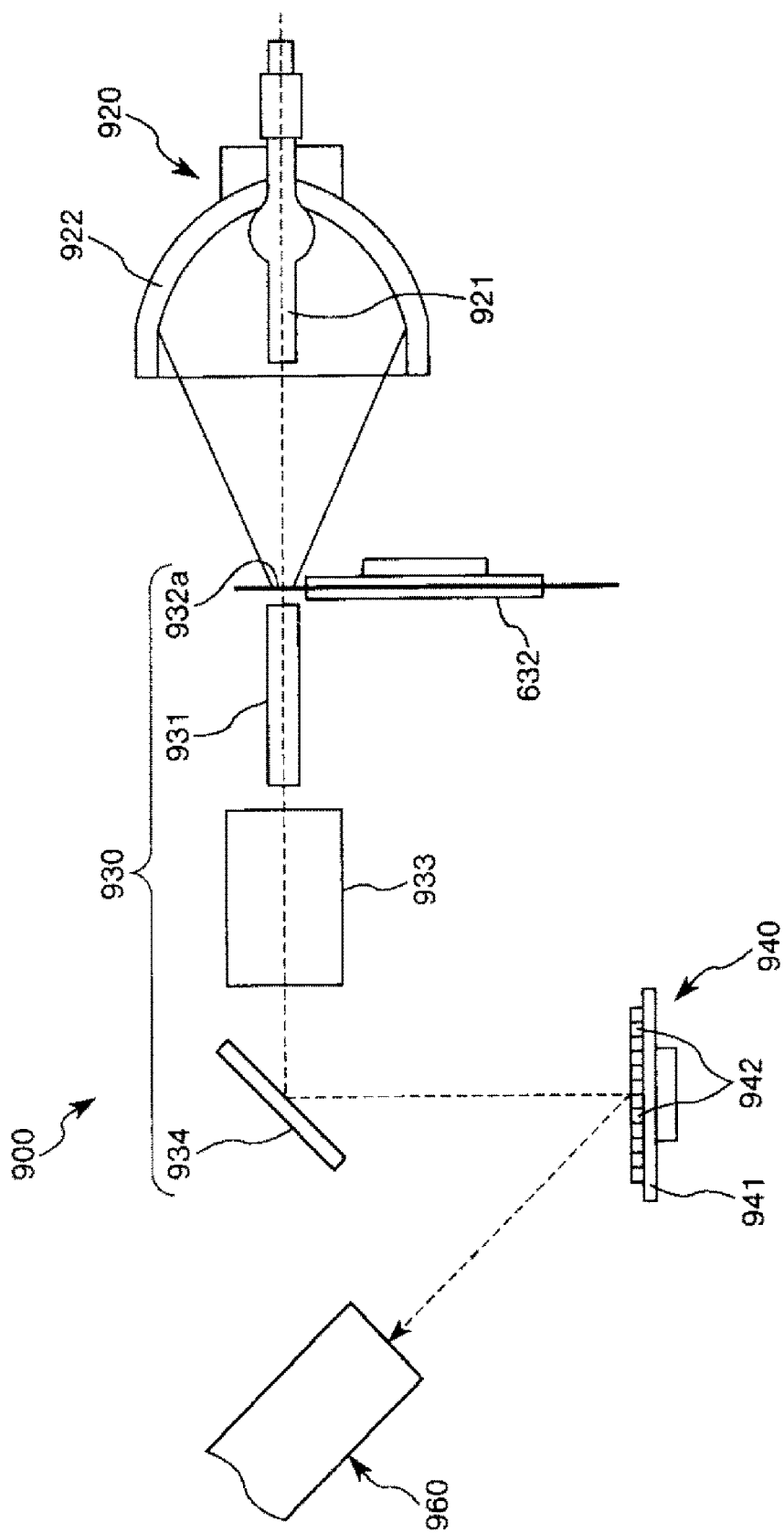
FIG. 17 is a diagram showing a schematic configuration of an image generation section provided to a virtual image display device according to a fifth embodiment of the invention.

FIG. 17 is a diagram showing a schematic configuration of an image generation section provided to the virtual image display device according to the fifth embodiment.

Hereinafter, the virtual image display device according to the fifth embodiment of the invention will be described with reference to these drawings with a focus mainly on the differences from the embodiment described above, and the explanation regarding similar matters will be omitted.

The fifth embodiment is substantially the same as the embodiment described above except the point that the configuration of the image generation section is different.

As shown in FIG. 17, the image generation section 900 has a light source device 920, a homogeneous illumination optical system 930, a light modulation device 940, and a projection optical system 960.

Such an image generation section 900 forms the picture light beam by modulating the light beam, which has been emitted from the light source device 920, in accordance with a video signal provided using the light modulation device 940.

The light source device 920 is provided with a super-high pressure mercury lamp 921 as a light source and a reflector 922. In such a configuration, the reflector 922 convergently reflects the light beam emitted from the super-high pressure mercury lamp 921. It should be noted that the light source is not limited to the super-high pressure mercury lamp, and a metal halide lamp, for example, can also be adopted.

The homogeneous illumination optical system 930 has a rod integrator 931, a color wheel 932, a relay lens group 933, and a reflecting mirror 934. In such a homogeneous illumination optical system 930, the light beam emitted from the light source device 920 passes through the color wheel 932, and then enters the rod integrator 931 at an angle.

The color wheel 932 is disposed so as to be able to be rotated by a drive source such as an electric motor not shown. Further, the color wheel 932 is provided with a filter surface 932a opposed to a port formed in an end on the entrance side of the rod integrator 931, and on the filter surface 932a, there are formed three color filters of R (red), G (green), and B (blue) arranged in the circumferential direction in the respective regions separated from each other. It should be noted that the color wheel 932 can be disposed on the exit side of the rod integrator 931.

The light beam having entered the color wheel 932 is separated in a time-series manner into three colored light beams of red (R) light beam, green (G) light beam, and blue (B) light beam by the filter surface 932a. The separation into the three colors of red, green, and blue is performed with a frequency higher than the frame frequency of the virtual image (image) to be displayed. By performing the color separation with such a frequency, it becomes possible to display a full color image.

The light beams (the red light beam, the green light beam, and the blue light beam) having passed through the color wheel 932 are guided to the inside of the rod integrator 931 through the entrance port thereof. The light guided to the inside of the rod integrator 931 causes reflection a plurality of times inside the rod integrator 931, and thus, the homogeneous illuminance is ensured on the exit surface of the rod integrator 931. Therefore, the light beam emitted from the exit port of the rod integrator 931 becomes to have a homogeneous illumination distribution.

The light beam having been emitted from the rod integrator 931 enters the light modulation device 940 as a homogeneous illumination light beam via the relay lens group 933 and the reflecting mirror 934.

The light modulation device 940 has a substrate 941, and a plurality of light modulation elements 942 (e.g., digital micromirror devices (DMD), note that "DMD" is a registered trademark of Texas Instruments (United States)) arranged on the substrate 941. The plurality of light modulation elements 942 is arranged in a matrix on the substrate 941. The number of the light modulation elements 942 is not particularly limited. In the case in which each of the light modulation elements 942 forms a pixel, the light modulation elements 942 are arranged as much as the pixels, for example, (horizontal pixels)×(vertical pixels)=1280×1024, or 640×480.

Each of the light modulation elements 942 has a movable mirror for reflecting the light beam having been input, and the movable mirror is changed in posture to an ON state in which the light beam reflected is guided to the projection optical system 960, and an OFF state in which the tilt is different from the tilt in the ON state, and the light beam reflected is guided to an absorber (not shown).

Further, the image generation section 900 is provided with a control section not shown, and the light modulation device 940 independently switches between the ON state and the OFF state of each of the light modulation elements 942 based on the video signal (image information) provided to the control section (not shown), for example. Thus, the predetermined picture light beam (the picture light beam) is formed. Then, the picture light beam thus formed enters the optical element 5 via the projection optical system 960.

By using such an image generation section 900, it is possible to make a sharp picture light beam enter the optical element 5.

According also to the fifth embodiment described above, substantially the same advantage as in the embodiments described above can be obtained.

Sixth Embodiment

Next, a virtual image display device according to a sixth embodiment of the invention will be explained.

Figure 18:
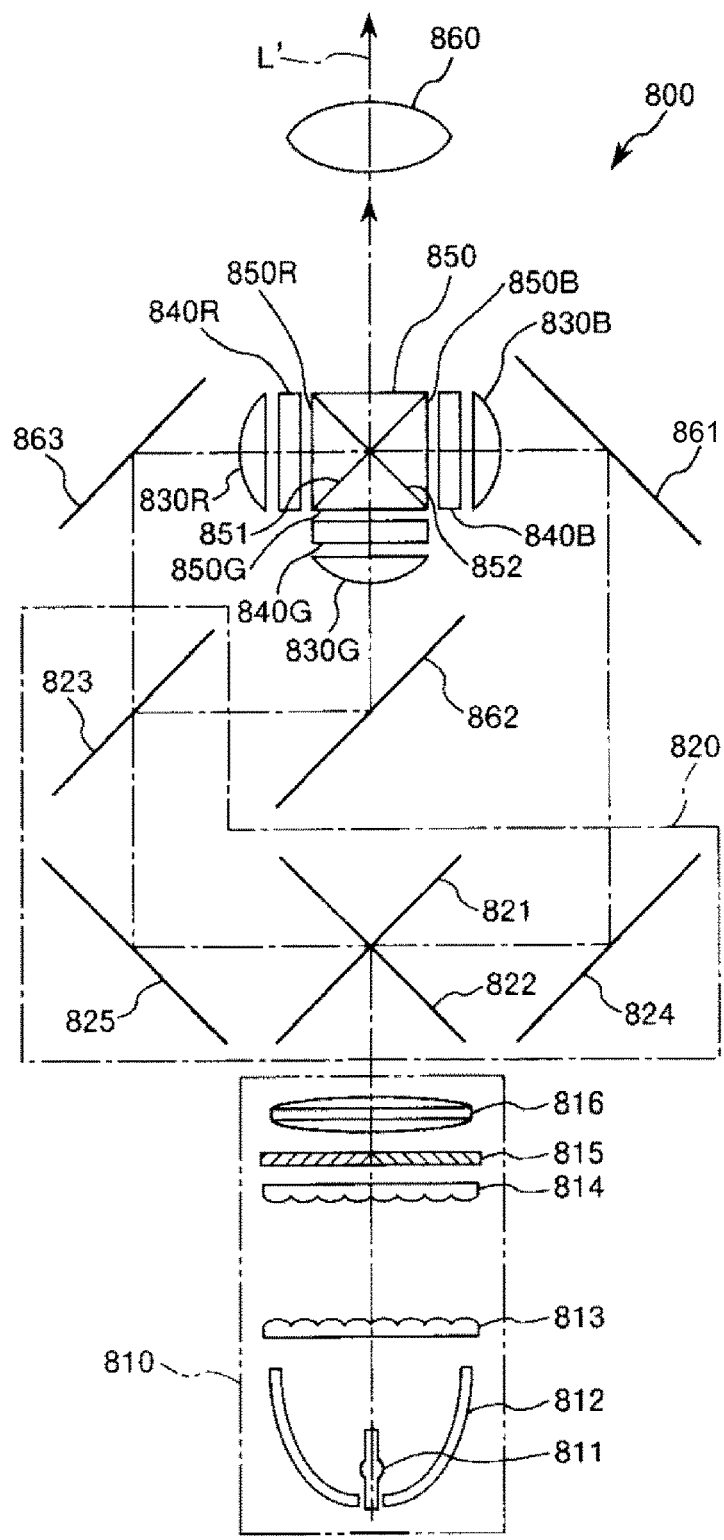
FIG. 18 is a diagram showing a schematic configuration of an image generation section provided to a virtual image display device according to a sixth embodiment of the invention.

FIG. 18 is a diagram showing a schematic configuration of an image generation section provided to the virtual image display device according to the sixth embodiment.

Hereinafter, the virtual image display device according to the sixth embodiment of the invention will be described with reference to the drawing with a focus mainly on the differences from the embodiment described above, and the explanation regarding similar matters will be omitted.

The sixth embodiment is substantially the same as the embodiment described above except the point that the configuration of the image generation section is different.

As shown in FIG. 18, the projector 800 is provided with an illumination optical system 810, a color separation optical system 820, collimating lenses 830R, 830G, and 830B, spatial light modulation devices 840R, 840G, and 840B, a cross dichroic prism 850, and a projection optical system 860.

The illumination optical system 810 has a light source 811, a reflector 812, a first lens array 813, a second lens array 814, a polarization conversion element 815, and an overlapping lens 816.

The light source 811 is a super-high pressure mercury lamp, and the reflector 812 is formed of a parabolic mirror. A radial light beam emitted from the light source 811 is reflected by the reflector 812 to be a roughly parallel light beam, and then emitted to the first lens array 813. It should be noted that the light source 811 is not limited to the super-high pressure mercury lamp, and a metal halide lamp, for example, can also be adopted. Further, the reflector 812 is not limited to the parabolic mirror, and it is possible to adopt a configuration of disposing a collimating concave lens on an exit surface of the reflector 812 formed of an ellipsoidal mirror.

The first lens array 813 and the second lens array 814 are each composed of small lenses arranged in a matrix. The light beam emitted from the light source 811 is divided by the first lens array 813 into a plurality of microscopic partial light beams, and the partial light beams are superimposed on each of the surfaces of the three spatial light modulation devices 840R, 840G, and 840B as illumination objects due to the second lens array 814 and the overlapping lens 816.

The polarization conversion element 815 has a function of aligning the light beam with random polarization into linearly polarized light (s-polarized light or p-polarized light) vibrating in one direction, and in the present embodiment, aligns it into the s-polarized light, which has a smaller loss of the light beam in the color separation optical system 820.

The color separation optical system 820 has a function of separating the light beam emitted from the illumination optical system 810 into colored light beams of three colors, namely red (R) light beam, green (G) light beam, and blue (B) light beam, and is provided with a B-light reflecting dichroic mirror 821, an RG-light reflecting dichroic mirror 822, a G-light reflecting dichroic mirror 823, and reflecting mirrors 824, 825.

The component of the blue light beam in the light beam emitted from the illumination optical system 810 is reflected by the B-light reflecting dichroic mirror 821, then further reflected by the reflecting mirrors 824, 861, and then reaches the collimating lens 830B. On the other hand, the components of the G light beam and the R light beam out of the light beam emitted from the illumination optical system 810 are reflected by the RG-light reflecting dichroic mirror 822, then further reflected by the reflecting mirror 825, and then reaches the G-light reflecting dichroic mirror 823. The component of the G light beam among these components is reflected by the G-light reflecting dichroic mirror 823 and the reflecting mirror 862, and then reaches the collimating lens 830G, and the component of the R light beam is transmitted through the G-light reflecting dichroic mirror 823, then is reflected by the reflecting mirror 863, and then reaches the collimating lens 830R.

The collimating lenses 830R, 830G, and 830B are set so that each of the plurality of partial light beams from the illumination optical system 810 becomes a roughly collimated light beam illuminating each of the spatial light modulation devices 840R, 840G, and 840B.

The red light beam transmitted through the collimating lens 830R reaches the spatial light modulation device (a first spatial light modulation device) 840R, the green light beam transmitted through the collimating lens 830G reaches the spatial light modulation device (a second spatial light modulation device) 840G, and the blue light beam transmitted through the collimating lens 830B reaches the spatial light modulation device (a third spatial light modulation device) 840B.

The spatial light modulation device 840R is a spatial light modulation device for modulating the red light beam in accordance with the image signal, and is a transmissive liquid crystal display device (LCD). A liquid crystal panel not shown provided to the spatial light modulation device 840R has a liquid crystal layer for modulating the light beam in accordance with the image signal encapsulated between a pair of transparent substrates. The red light beam modulated by the spatial light modulation device 840R enters a cross dichroic prism 850 as a color combining optical system. It should be noted that the configurations and the functions of the spatial light modulation devices 840G, 840B are the same as those of the spatial light modulation device 840R.

The cross dichroic prism 850 is formed to have a prismatic shape with a roughly square cross-section by bonding four triangular prisms to each other, and dielectric multilayer films 851, 852 are disposed along the bonding surfaces having an X shape. The dielectric multilayer film 851 transmits the green light beam while reflecting the red light beam, and the dielectric multilayer film 852 transmits the green light beam while reflecting the blue light beam. Further, the cross dichroic prism 850 inputs the modulated light beams of the respective colors emitted from the spatial light modulation devices 840R, 840G, and 840B through planes of incidence 850R, 850G, and 850B and then combines the modulated light beams with each other to thereby form the picture light beam, and then emits the picture light beam to the projection optical system 860.

The picture light beam having been emitted from the projection optical system 860 enters the optical element 5.

By using such an image generation section 800, it is possible to make a sharp picture light beam enter the optical element 5.

According also to the sixth embodiment described above, substantially the same advantage as in the embodiments described above can be obtained.

It should be noted that although in the present embodiment, the virtual image display device provided with the image generation section using three transmissive liquid crystal display devices (LCD) as the spatial light modulation devices (light valves) is explained, the configuration of the image generation section provided with the spatial light modulation devices is not limited thereto. For example, it is also possible to adopt the configuration using three reflective liquid crystal display devices (LCD) as the spatial light modulation devices. Further, it is also possible to adopt the configuration of using, for example, two liquid crystal display devices regardless whether the liquid crystal display device is the transmissive type or the reflective type.

Seventh Embodiment

Next, a virtual image display device according to a seventh embodiment of the invention will be explained.

Figure 19:
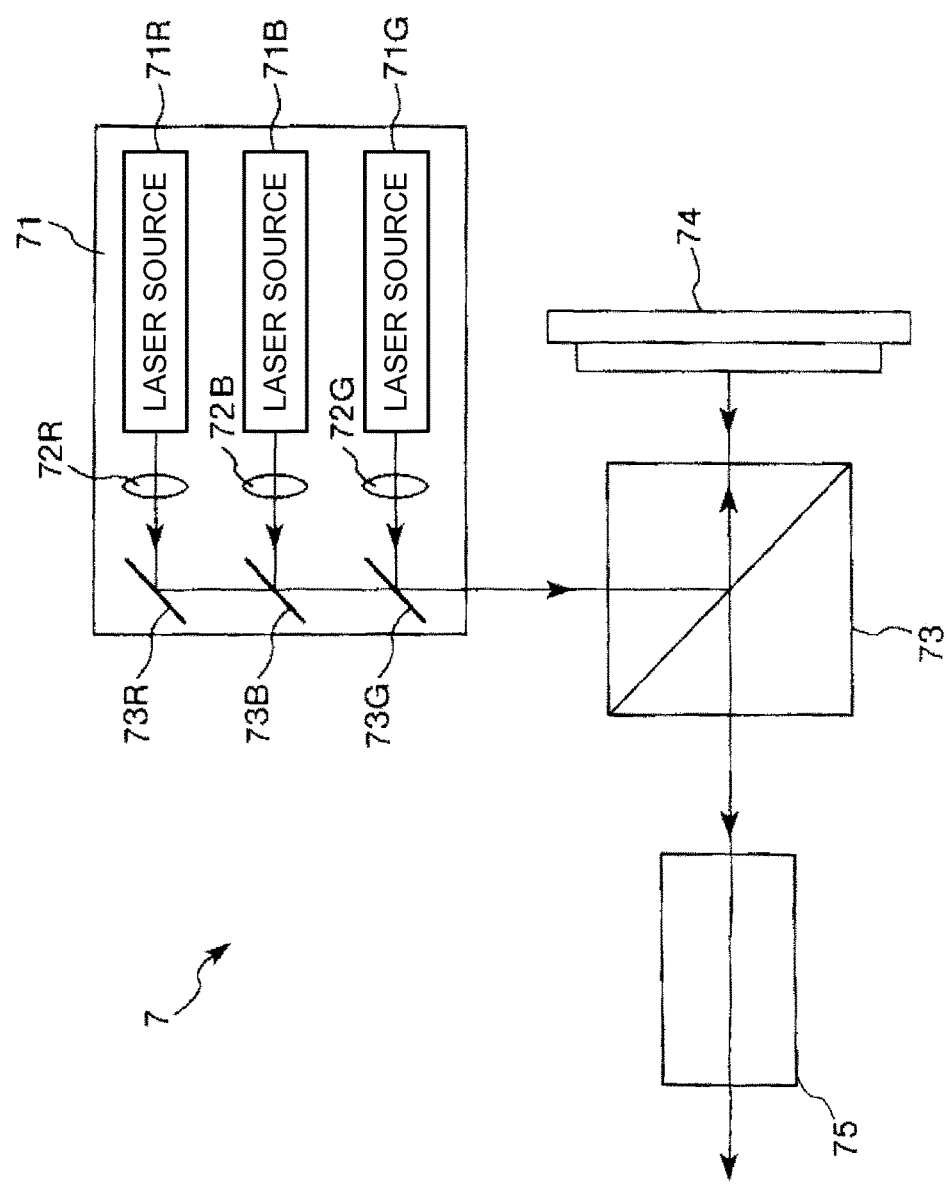
FIG. 19 is a diagram showing a schematic configuration of an image generation section provided to a virtual image display device according to a seventh embodiment of the invention.

FIG. 19 is a diagram showing a schematic configuration of an image generation section provided to the virtual image display device according to the seventh embodiment.

Hereinafter, the virtual image display device according to the seventh embodiment of the invention will be described with reference to the drawing with a focus mainly on the differences from the embodiment described above, and the explanation regarding similar matters will be omitted.

The seventh embodiment is substantially the same as the embodiment described above except the point that the configuration of the image generation section is different.

As shown in FIG. 19, the image generation section 7 has a light source unit 71, a PBS prism 73, a reflective liquid crystal panel 74, and a projection optical system 75.

The light source unit 71 is provided with laser sources 71R, 71G, and 71B for respective colors of red, green, and blue, and collimator lenses 72R, 72G, and 72B, and dichroic mirrors 73R, 73G, and 73B disposed so as to correspond to the laser sources 71R, 71G, and 71B.

The laser sources 71R, 71G, and 71B each have a light source and a drive circuit not shown. Further, the laser source 71R emits a red laser beam, the laser source 71G emits a green laser beam, and the laser source 71B emits a blue laser beam. The laser beams of the respective colors emitted from the laser sources 71R, 71G, and 71B are each a linearly polarized light beam, and are the same in vibration direction as each other (e.g., an s-polarized light beam).

The laser beams of the respective colors emitted from the respective laser sources 71R, 71G, and 71B are collimated by the collimator lenses 72R, 72G, and 72B, and then enter the dichroic mirrors 73R, 73G, and 73B, respectively. The dichroic mirror 73R has a property of reflecting the red laser beam. The dichroic mirror 73B has a property of reflecting the blue laser beam, and at the same time transmitting the red laser beam. The dichroic mirror 73G has a property of reflecting the green laser beam, and at the same time transmitting the red laser beam and the blue laser beam.

The laser sources 71R, 71G, and 71B are controlled to be driven so as to be put on and put off sequentially, and thus, the red laser beam, the green laser beam and the blue laser beam are emitted sequentially. The laser beams of the respective colors thus emitted each pass through the collimator lens and the dichroic mirror, and are then reflected by the reflecting surface of the polarization beam splitter (PBS) prism 73, and then projected on the reflective liquid crystal panel 74.

The reflective liquid crystal panel 74 is a spatial light modulation device, and is an LCOS (Liquid Crystal on Silicon), and has a reflecting layer.

The laser beams (the picture light beam) of the respective colors having been reflected by the reflecting layer and then transmitted through the PBS prism 73 enter the optical element 5 via the projection optical system 75.

It should be noted that the laser beams of the respective colors having been reflected by the reflective liquid crystal panel 74 are each rotated in the vibration direction as much as 90° to be converted into a p-polarized light beam.

By using such an image generation section 7, it is possible to make a sharp picture light beam enter the optical element 5.

According also to the seventh embodiment described above, substantially the same advantage as in the embodiments described above can be obtained.

It should be noted that although in the present embodiment, the single-panel system using a single reflective liquid crystal panel 74 is adopted, the configuration of the image generation section is not limited thereto. For example, it is also possible to adopt a three-panel system disposing the reflective liquid crystal panels for the red light beam, the green light beam, and the blue light beam, respectively. Further, for example, it is also possible to adopt the configuration of using the transmissive liquid crystal panel as the spatial light modulation device (the light valve) instead of the reflective liquid crystal panel.

Eighth Embodiment

Next, a virtual image display device according to an eighth embodiment of the invention will be explained.

Figure 20:
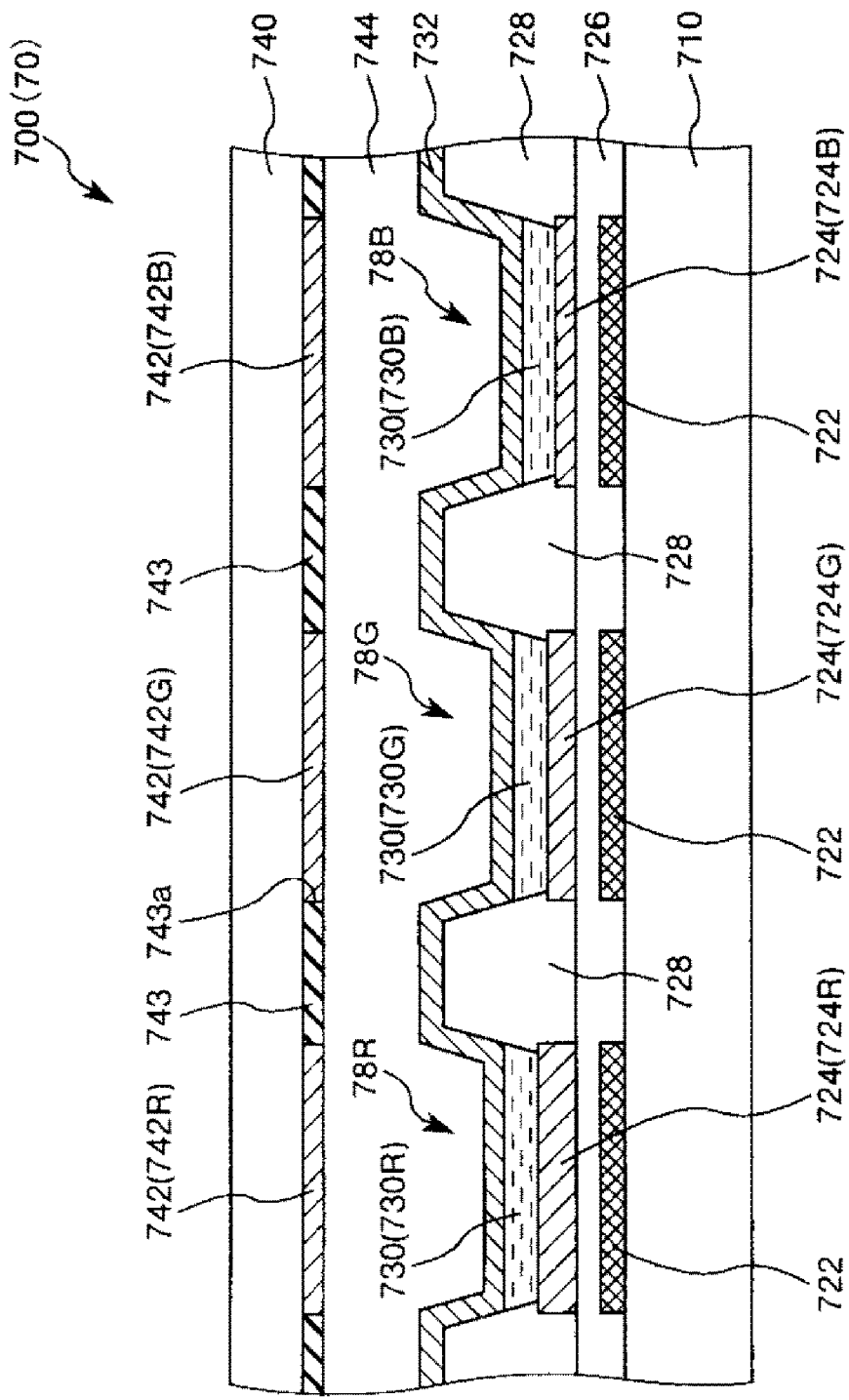
FIG. 20 is a diagram showing a schematic configuration of an image generation section provided to a virtual image display device according to an eighth embodiment of the invention.

FIG. 20 is a diagram showing a schematic configuration of an image generation section provided to the virtual image display device according to the eighth embodiment.

Hereinafter, the virtual image display device according to the eighth embodiment of the invention will be described with reference to the drawing with a focus mainly on the differences from the embodiment described above, and the explanation regarding similar matters will be omitted.

The eighth embodiment is substantially the same as the embodiment described above except the point that the configuration of the image generation section is different.

As shown in FIG. 20, the image generation section 700 has an organic EL (electroluminescence) device 70, and a collimator lens (not shown).

The organic EL device 70 is provided with a base member 710, reflecting layers 722, a protective layer 726, anodes 724 (724R, 724G, and 724B), organic functional layers 730 (730R, 730G, and 730B), a cathode 732, partition sections 728, a sealing layer 744, and a color filter substrate 740. Further, the organic EL device 70 is the top-emission type for emitting the light on the color filter substrate 740 side.

Here, an organic EL element 78R is formed of the anode 724R, the organic functional layer 730R, and a part of the cathode 732. Similarly, an organic EL element 78G is formed of the anode 724G, the organic functional layer 730G, and a part of the cathode 732, and an organic EL element 78B is formed of the anode 724B, the organic functional layer 730B, and a part of the cathode 732.

On the base member 710, there are disposed TFTs (not shown) each provided with a semiconductor film, a gate insulation layer, a gate electrode, a drain electrode, and a source electrode so as to correspond respectively to the organic EL elements 78R, 78G, and 78B. Further, since the organic EL device 70 is the top emission type, the base member 710 can be formed of either of a light transmissive material and a non-light transmissive material.

The protective layer 726 is disposed so as to cover the base member 710 and the reflecting layer 722. The upper surface of the protective layer 726 is planarized, and the protective layer 726 is formed of an inorganic insulating film such as a $SiO_2$ film, or an organic resin such as an acrylic resin.

The anodes 724R, 724G, and 724B are disposed on the protective layer 726. The anodes 724 are each formed of a conductive material having a light transmissive property, and are formed of, for example, ITO.

The partition sections 728 are disposed on the protective layer 726. The partition sections 728 are formed of an organic resin such as acrylic resin.

The organic functional layers 730R, 730G, and 730B are respectively formed on the anodes 724R, 724G, and 724B. The organic functional layer 730R emits a red light beam, the organic functional layer 730G emits a green light beam, and the organic functional layer 730B emits a blue light beam.

The organic functional layers 730R, 730G, and 730B are each formed of, for example, a hole transport layer, a light emitting layer, and an electron transport layer. In the organic functional layers 730R, 730G, and 730B, by the recombination of the holes injected from the hole transport layer and the electrons injected from the electron transport layer occurring in the light emitting layer, the red light beam, the green light beam, and the blue light beam can be obtained, respectively. By providing the organic functional layers 730R, 730G, and 730B emitting the respective three light beams, the organic EL device 70 is made capable of full-color light emission.

The cathode 732 is disposed so as to cover the partitions 728 and the respective organic functional layers 730R, 730G, and 730B. The cathode 732 forms a common electrode corresponding to all of the anodes. The cathode 732 functions as a semi-transmissive reflecting layer having a property of transmitting apart of the light beam having reached the surface thereof, and at the same time reflecting another part thereof. The cathode 732 is formed of, for example, magnesium (Mg), or silver (Ag) as a simple substance, or an alloy consisting primarily of any of these materials.

Further, on the cathode 732, there is disposed a passivation layer (not shown). The passivation layer is a protective film formed of an inorganic material having low gas permeability such as $SiO_2$, and for preventing the deterioration of the organic EL device 70 due to infiltration of oxygen or moisture.

The color filter substrate 740 is disposed on the opposite side of the organic EL elements 78R, 78G, and 78B having such a configuration to the base member 710.

The color filter substrate 740 is formed of a light transmissive material such as glass. On the surface of the color filter substrate 740 located on the base member 710 side, there are formed color filters 742R, 742G, and 742B, and light blocking layers 743.

The color filters 742R, 742G, and 742B are disposed so as to overlap the organic EL elements 78R, 78G, and 78B, respectively, in a planar view. Here, the three organic EL elements 78R, 78G, and 78B described above and the color filters 742R, 742G, and 742B disposed so as to respectively overlap these elements constitute a pixel of the organic EL device 70. In other words, FIG. 20 shows one pixel of the organic EL device 70. It should be noted that the number of pixels of the organic EL device 70 is not particularly limited.

Further, the color filters 742R, 742G, and 742B are for selectively transmitting the light beams of the respective wavelength bands of the red light beam, the green light beam, and the blue light beam out of the light beams emitted from the organic EL elements 78R, 78G, and 78B, respectively. The color filter 742R corresponds to the wavelength band of the red light beam, the color filter 742G corresponds to the wavelength band of the green light beam, and the color filter 742B corresponds to the wavelength band of the blue light beam.

Further, the light blocking layers 743 are disposed so as to partition the color filters 742R, 742G, and 742B.

Such a color filter substrate 740 is bonded to the base member 710 via the sealing layer 744. The sealing layer 744 is formed of hardening resin having a light transmissive property such as epoxy resin.

The red light beam, the green light beam, and the blue light beam having been transmitted through the respective color filters 742R, 742G, and 742B of the organic EL device 70 having such a configuration enter the collimator lens (not shown). The red light beam, the green light beam, and the blue light beam having been emitted from the organic EL device 70 are each adjusted (modulated) into a light beam in a roughly parallel state by the collimator lens (not shown), and are transmitted to the optical element 5 as the picture light beam modulated.

By using such an image generation section 700, it is possible to make a sharp picture light beam enter the optical element 5, and at the same time, achieve miniaturization of the image generation section 700.

According also to the eighth embodiment described above, substantially the same advantage as in the embodiments described above can be obtained.

Although the virtual display device and the head-mounted display according to the invention are explained hereinabove based on the illustrated embodiments, the invention is not limited to these embodiments. For example, in the virtual image display device according to the invention, the configuration of each section can be replaced with an arbitrary configuration having substantially the same function, and further, it is also possible to add an arbitrary constituent.

Further, the invention can be the combination of any two or more configurations (features) of the embodiments described above.

Further, the virtual image display device according to the invention is not limited to the case of being applied to the eyeglass type head-mounted display providing the virtual image is formed as an image visually recognized by the observer, but can also be applied to, for example, a helmet-type or headset-type head-mounted display, and an image display device having a configuration of being supported by the body of the observer such as the neck or the shoulder. Further, although in the embodiments described above, the case in which the entirety of the image display device is mounted on the head of the observer is explained as an example, it is also possible for the image display device to be provided with a part, which is mounted on the head of the observer, and a part, which is mounted on a part of the observer other than the head or carried.

Further, although in the embodiments described above, the configuration of the binocular type transmissive head-mounted display is explained as a representative example, it is also possible to adopt the configuration of, for example, a non-transmissive head-mounted display in which the external sight is blocked in the state in which the observer wears the head-mounted display.

Further, the head-mounted display according to the invention can also be provided with a device for outputting a sound such as a speaker or a headphone.

The entire disclosure of Japanese Patent Application No. 2014-066358 filed Mar. 27, 2014 is expressly incorporated by reference herein.

What is claimed is:

1. A virtual image display device comprising:
    an image generator configured to generate and emit a picture light beam modulated based on a video signal; and
    an optical element including:
        a plane of incidence to which the picture light beam emitted from the image generation section is input, and
        an exit surface configured to emit the picture light beam after a cross-sectional area of the picture light beam input to the plane of incidence has been enlarged,
    wherein the optical element includes:
        a first light guide and a second light guide configured to optically connect the plane of incidence and the exit surface to each other and to guide the picture light beam, a diameter of the light beam entering the optical element overlapping each of the first light guide and the second light guide such that the light beam enters the first and second light guides in a straddling manner, and
        a first light branching layer disposed between the first light guide and the second light guide and arranged orthogonal to the plane of incidence such that the first light branching layer intersects the plane of incidence, the first light branching layer being configured to partially reflect and partially transmit the picture light beam, and
    the picture light beam emitted from the image generation section is configured to obliquely enter the first light branching layer,
    wherein a first surface of the first light guide which intersects with the plane of incidence is configured so as to be parallel with a second surface of the second light guide which intersects with the plane of incidence.

2. The virtual image display device according to claim 1, wherein
    the optical element includes a first one-dimensional array having the first light guide and the second light guide stacked along a first direction.

3. The virtual image display device according to claim 2, wherein
    the optical element includes a second one-dimensional array having another first light guide and another second light guide one-dimensionally arranged along a second direction that is different from the first direction, and
    the second one-dimensional array is disposed so that the picture light beam emitted from one exit surface of the first one-dimensional array enters a plane of incidence of the second one-dimensional array.

4. The virtual image display device according to claim 3, wherein
    the one exit surface of the first one-dimensional array and the plane of incidence of the second one-dimensional array are physically connected to each other.

5. The virtual image display device according to claim 1, wherein
    wherein the optical element further includes:
        a third light guide configured to optically connect the plane of incidence and the exit surface to each other and to guide the picture light beam, and
        a second light branching layer disposed between the first light guide and the third light guide, and configured to partially reflect and partially transmit the picture light beam,
    the first light guide and the second light guide are arranged along a first direction, and
    the first light guide and the third light guide are arranged along a second direction that is different from the first direction.

6. The virtual image display device according to claim 1, wherein
    a width of each of the first light guide and the second light guide along a direction in which the first light guide and the second light guide are arranged, is smaller than a diameter of the picture light beam along the direction on the plane of incidence.

7. The virtual image display device according to claim 1, wherein
    the plane of incidence and the exit surface have equal absolute tilt angle values with respect to the first light branching layer.

8. The virtual image display device according to claim 1, further comprising:
    a light deflector configured to deflect the picture light beam emitted from the exit surface of the optical element toward a pre-selected target,
    wherein the light deflector includes a hologram.

9. The virtual image display device according to claim 1, further comprising:
    a magnifying light guide configured to two-dimensionally magnify the picture light beam emitted from the optical element,
    wherein the magnifying light guide includes:
        a light entrance to which the picture light beam is input,
        a first magnifying light guide section configured to include:
            a first reflecting surface disposed obliquely to an incident direction in which the picture light beam enters the light entrance section, and
            a second reflecting surface disposed parallel to the first reflecting surface, and the second reflecting surface is configured to partially reflect and partially transmit the picture light beam, and
        a second magnifying light guide section configured to guide the picture light beam transmitted through the second reflecting surface.

10. The virtual image display device according to claim 1, wherein
    the image generator includes:
        a light source configured to emit a light beam, and
        a light scanner configured to move the light beam emitted from the light source to perform scanning.

11. The virtual image display device according to claim 1, wherein
the image generator includes:
a light source, and
a spatial light modulator configured to modulate a light beam emitted from the light source in accordance with the video signal.

12. The virtual image display device according to claim 1, wherein
the image generator includes an organic electroluminescence panel.

13. A head-mounted display comprising:
the virtual image display device according to claim 1, and
a head-mountable frame supporting the virtual image display device.

14. A head-mounted display comprising:
the virtual image display device according to claim 2, and
a head-mountable frame supporting the virtual image display device.

15. A head-mounted display comprising:
the virtual image display device according to claim 3, and
a head-mountable frame supporting the virtual image display device.

16. A head-mounted display comprising:
the virtual image display device according to claim 4, and
a head-mountable frame supporting the virtual image display device.

17. A head-mounted display comprising:
the virtual image display device according to claim 5, and
a head-mountable frame supporting the virtual image display device.

18. A head-mounted display comprising:
the virtual image display device according to claim 6, and
a head-mountable frame supporting the virtual image display device.

19. A head-mounted display comprising:
the virtual image display device according to claim 7, and
a head-mountable frame supporting the virtual image display device.

20. The head-mounted display according to claim 13, wherein
the optical element is disposed so that the cross-sectional area of the picture light beam emitted from the exit surface of the optical element is enlarged in a direction corresponding to an arrangement of a right eye and a left eye of a user of the device.

* * * * *